US012659863B2

(12) United States Patent
Jiao et al.

(10) Patent No.: US 12,659,863 B2
(45) Date of Patent: Jun. 16, 2026

(54) COMMUNICATION METHOD, APPARATUS, AND SYSTEM

(71) Applicant: HUAWEI TECHNOLOGIES CO., LTD., Shenzhen (CN)

(72) Inventors: Chunxu Jiao, Shanghai (CN); Hongjia Su, Shanghai (CN); Lei Lu, Munich (DE)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 342 days.

(21) Appl. No.: 18/424,708

(22) Filed: Jan. 26, 2024

(65) Prior Publication Data

US 2024/0172116 A1     May 23, 2024

Related U.S. Application Data

(63) Continuation of application No. PCT/CN2022/103059, filed on Jun. 30, 2022.

(30) Foreign Application Priority Data

Jul. 29, 2021   (CN) .......................... 202110867122.0

(51) Int. Cl.
H04W 52/02          (2009.01)
H04L 5/00           (2006.01)
H04W 72/40          (2023.01)
(52) U.S. Cl.
CPC ....... H04W 52/0229 (2013.01); H04L 5/0005 (2013.01); H04L 5/0098 (2013.01); H04W 72/40 (2023.01)

(58) Field of Classification Search
None
See application file for complete search history.

(56) References Cited

U.S. PATENT DOCUMENTS

| 2020/0288402 A1* | 9/2020 | Nam ...................... H04W 72/23 |
| 2021/0058866 A1 | 2/2021 | Hosseini et al. |
| 2021/0058909 A1* | 2/2021 | Wong ................... H04W 72/23 |
| 2024/0049177 A1* | 2/2024 | Shi .................... H04W 52/0216 |

FOREIGN PATENT DOCUMENTS

WO       2019233195 A1   12/2019

* cited by examiner

*Primary Examiner* — Robert M Morlan

(57)                ABSTRACT

Embodiments of the present invention disclose a communication method, apparatus, and system. The method includes: A first terminal device sends a wake-up signal to a second terminal device by using a first frequency domain resource, where the wake-up signal is used to activate a second frequency domain resource, the first frequency domain resource is used by two or more terminal devices to transmit wake-up signals, and the first frequency domain resource does not overlap the second frequency domain resource; and the first terminal device sends sidelink SL data to the second terminal device by using the second frequency domain resource. Embodiments of the present invention can reduce power consumption of the terminal devices in sidelink communication.

20 Claims, 7 Drawing Sheets

Wake-up signal, indicating a first terminal device to activate a second frequency domain unit First frequency domain resource Second frequency domain resource Time Deactivated state          Activated state Terminal device 1                    Terminal device 2

SL BWP

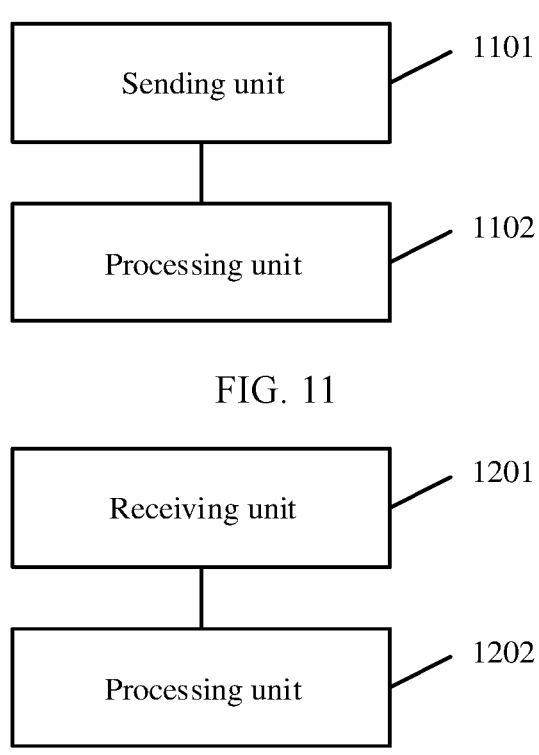
FIG. 11
FIG. 12
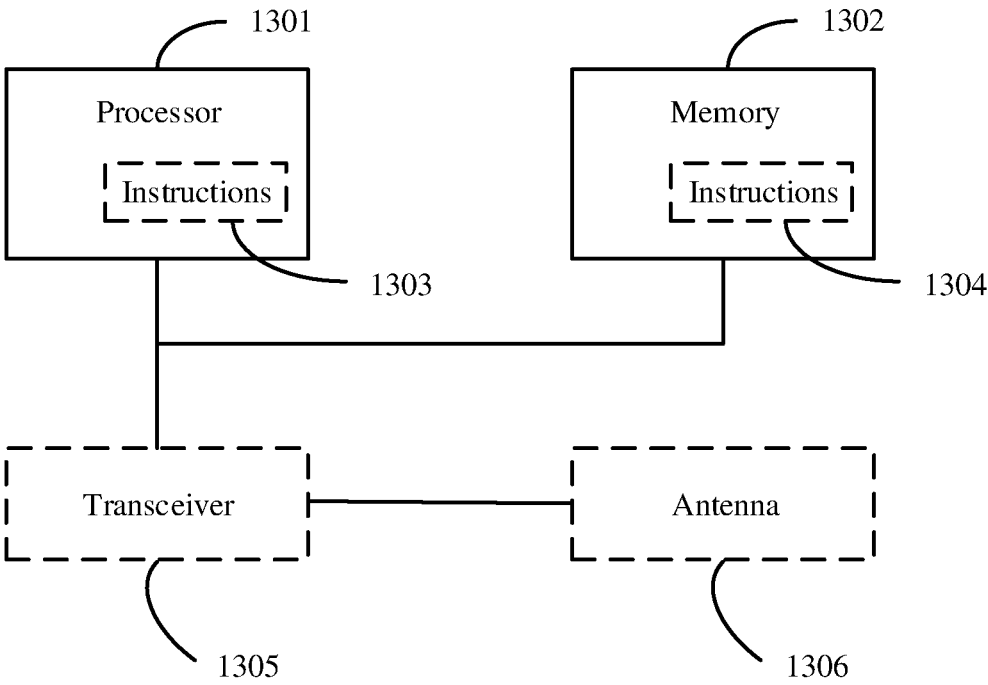
FIG. 13

1

COMMUNICATION METHOD, APPARATUS, AND SYSTEM

CROSS-REFERENCE TO RELATED APPLICATIONS

This application is a continuation of International Application No. PCT/CN2022/103059, filed on Jun. 30, 2022, which claims priority to Chinese Patent Application No. 202110867122.0, filed on Jul. 29, 2021. The disclosures of the aforementioned applications are hereby incorporated by reference in their entireties.

TECHNICAL FIELD

Embodiments of the present invention relate to the field of communication technologies, and in particular, to a communication method, apparatus, and system.

BACKGROUND

In a communication system, as there are continuously increasing information transmission requirements, software and hardware complexity of the communication system greatly increases. The increase in complexity directly causes a great increase in power consumption of a terminal device. Currently, in a process of communication between a terminal device and a network device, to reduce power consumption of the terminal device, the network device may periodically send a wake-up signal (WUS) to the terminal device. When the wake-up signal has a specific value, the terminal device may be woken up to send or receive information.

In the communication system, in addition to the communication between the terminal device and the network device, there is communication between terminal devices, namely, sidelink (sidelink, SL) communication. How to reduce power consumption of the terminal devices during the communication between the terminal devices becomes an urgent technical problem to be resolved.

SUMMARY

Embodiments of the present invention disclose a communication method, apparatus, and system, to reduce power consumption of a terminal device on a sidelink.

A first aspect discloses a communication method. The communication method may be applied to a first terminal device, or may be applied to a module (for example, a chip) in the first terminal device. The following uses an example in which the communication method is applied to the first terminal device for description. The communication method may include:

The first terminal device sends a wake-up signal to a second terminal device by using a first frequency domain resource. The wake-up signal is used to activate a second frequency domain resource. The first frequency domain resource is used by two or more terminal devices to transmit wake-up signals. The first frequency domain resource does not overlap the second frequency domain resource.

The first terminal device sends SL data to the second terminal device by using the second frequency domain resource.

In this embodiment of the present invention, when the first terminal device serves as a sending terminal device and has SL data to be sent, the sending terminal device may send the wake-up signal to a receiving terminal device by using one frequency domain resource. In this way, the receiving terminal device (namely, the second terminal device) may activate, based on the wake-up signal, a frequency domain resource for transmitting the SL data, and then the sending terminal device may send the SL data to the receiving terminal device by using the activated frequency domain resource. It can be learned that when there is no SL data to be transmitted, the frequency domain resource for transmitting the SL data may be in a deactivated state, or when there is SL data to be transmitted, the frequency domain resource may be activated by using the wake-up signal that is transmitted by using one frequency domain resource. This can reduce active time of the frequency domain resource for transmitting the SL data. Because bandwidth of the frequency domain resource for transmitting the wake-up signal is far less than bandwidth of the frequency domain resource for transmitting the SL data, a frequency domain range that needs to be continuously monitored by the receiving terminal device is reduced. Therefore, power consumption of the terminal device can be reduced while normal SL data transmission can be ensured. In addition, because the first frequency domain resource may be used not only by the first terminal device but also by another terminal device, in other words, the first frequency domain resource may be shared by a plurality of terminal devices, utilization of the frequency domain resource can be improved.

In a possible implementation, a modulation scheme for the wake-up signal is on-off keying (OOK) or binary phase shift keying (BPSK).

In this embodiment of the present invention, in the OOK, information is not carried by using a phase or an amplitude, but simply transmitted based on whether a signal is sent, and the receiving terminal device does not need to demodulate the wake-up signal, but only needs to be able to detect the signal through envelope detection. Therefore, the receiving terminal device only needs to include a simple receiver structure to receive the wake-up signal. A design of this type of receiver is extremely simple, can reduce hardware implementation complexity of the terminal device, and therefore can reduce power consumption of the receiving terminal device. Similarly, a wake-up signal modulated by using the BPSK may also be received by using a receiver with low power consumption.

In a possible implementation, the wake-up signal includes a first sequence. The first sequence is determined based on a physical layer destination identifier of the second terminal device. The first sequence occupies a plurality of time units.

In this embodiment of the present invention, because one sequence in the wake-up signal is determined based on the physical layer destination identifier of the receiving terminal device, the receiving terminal device may blindly detect the wake-up signal based on the physical layer destination identifier of the receiving terminal device, and then accurately receive the wake-up signal sent to the receiving terminal device. This can avoid a problem that the frequency domain resource for transmitting the SL data is incorrectly activated due to reception of a wake-up signal sent to another terminal device, and therefore avoid a false alarm. The sequence may be a bitstream including a plurality of sequence values.

In a possible implementation, the first sequence includes the physical layer destination identifier of the second terminal device.

In this embodiment of the present invention, the receiving terminal device may determine, based on whether the wake-up signal includes the physical layer destination identifier of the receiving terminal device, whether the wake-up signal is a wake-up signal sent to the receiving terminal device.

Therefore, the receiving terminal device may accurately receive the wake-up signal sent to the receiving terminal device. This can avoid the problem that the frequency domain resource for transmitting the SL data is incorrectly activated due to the reception of the wake-up signal sent to the another terminal device, and therefore avoid the false alarm.

In a possible implementation, the first sequence further includes a sequence identifier. The sequence identifier is used to identify a start location of the first sequence.

In this embodiment of the present invention, when performing blind detection, the receiving terminal device may first determine the start location of the first sequence based on the sequence identifier, and then determine, based on whether the first sequence includes the physical layer destination identifier of the receiving terminal device, whether the wake-up signal is the wake-up signal sent to the receiving terminal device. This can reduce a quantity of times the terminal device performs determining by using the physical layer destination identifier of the terminal device.

In a possible implementation, the wake-up signal further includes a second sequence. The second sequence includes a sequence obtained after the physical layer destination identifier of the second terminal device is negated. Time units occupied by the first sequence and the second sequence are the same.

In this embodiment of the present invention, the receiving terminal device may determine, based on whether the wake-up signal includes the physical layer destination identifier of the receiving terminal device and the sequence obtained after the physical layer destination identifier of the receiving terminal device is negated, whether the wake-up signal is the wake-up signal sent to the receiving terminal device. Therefore, the receiving terminal device may accurately receive the wake-up signal sent to the receiving terminal device. This can avoid the problem that the frequency domain resource for transmitting the SL data is incorrectly activated due to the reception of the wake-up signal sent to the another terminal device, and therefore avoid the false alarm.

In a possible implementation, the communication method may further include:

The first terminal device determines a third frequency domain resource from the first frequency domain resource based on a physical layer destination identifier of the second terminal device.

That the first terminal device sends a wake-up signal to a second terminal device by using a first frequency domain resource includes:

The first terminal device sends the wake-up signal to the second terminal device by using the third frequency domain resource.

In this embodiment of the present invention, the sending terminal device sends the wake-up signal to the receiving terminal device only on the frequency domain resource determined based on the physical layer destination identifier of the receiving terminal device, and correspondingly, the receiving terminal device may receive, only on the frequency domain resource determined based on the physical layer destination identifier of the receiving terminal device, the wake-up signal sent to the receiving terminal device. This can avoid the problem that the frequency domain resource for transmitting the SL data is incorrectly activated due to the reception of the wake-up signal sent to the another terminal device, and therefore avoid the false alarm. In addition, the receiving terminal device only needs to detect, on the frequency domain resource determined based on the physical layer destination identifier of the receiving terminal device, the wake-up signal sent to the receiving terminal device. Therefore, bandwidth of the frequency domain resource detected by the terminal device can be reduced, and the power consumption of the terminal device can be further reduced.

In a possible implementation, the communication method may further include:

The first terminal device determines a second time domain resource from a first time domain resource based on the physical layer destination identifier of the second terminal device. The first time domain resource is a time domain resource corresponding to the first frequency domain resource. The second time domain resource is a time domain resource corresponding to the third frequency domain resource.

That the first terminal device sends the wake-up signal to the second terminal device by using the third frequency domain resource includes:

The first terminal device sends the wake-up signal to the second terminal device by using the second time domain resource and the third frequency domain resource.

In this embodiment of the present invention, the sending terminal device sends the wake-up signal to the receiving terminal device only on the time domain resource determined based on the physical layer destination identifier of the receiving terminal device, and correspondingly, the receiving terminal device may receive, only on the time domain resource determined based on the physical layer destination identifier of the receiving terminal device, the wake-up signal sent to the receiving terminal device. This can avoid the problem that the frequency domain resource for transmitting the SL data is incorrectly activated due to the reception of the wake-up signal sent to the another terminal device, and therefore avoid the false alarm. In addition, the receiving terminal device only needs to detect, on the time domain resource determined based on the physical layer destination identifier of the receiving terminal device, the wake-up signal sent to the receiving terminal device. Therefore, time for the receiving terminal device to detect the wake-up signal can be reduced, and the power consumption of the terminal device can be further reduced.

In a possible implementation, that the first terminal device determines a second time domain resource from a first time domain resource based on the physical layer destination identifier of the second terminal device includes:

The first terminal device determines the second time domain resource from the first time domain resource based on P most significant bits (most significant bits, MSBs) in the physical layer destination identifier of the second terminal device.

That the first terminal device determines a third frequency domain resource from the first frequency domain resource based on a physical layer destination identifier of the second terminal device includes:

The first terminal device determines the third frequency domain resource from the first frequency domain resource based on Q least significant bits (least significant bits, LSBs) in the physical layer destination identifier of the second terminal device. P and Q are integers less than or equal to A. A is a quantity of bits included in the physical layer destination identifier.

In a possible implementation, the first frequency domain resource and the second frequency domain resource correspond to different radio frequency sending modules and/or radio frequency receiving modules.

In this embodiment of the present invention, the frequency domain resource for transmitting the wake-up signal and the frequency domain resource for transmitting the SL data correspond to different radio frequency sending modules and/or radio frequency receiving modules. In this case, the wake-up signal may be transmitted by using a simplified radio frequency sending and/or receiving module with low power consumption, and the SL data may be transmitted by using a radio frequency sending and/or receiving module with normal power consumption. This can further reduce power consumption for transmitting the wake-up signal. In addition, use of the different radio frequency sending modules and/or radio frequency receiving modules may further ensure that both the two frequency domain resources may be in an activated state, or one frequency domain resource is in the activated state, and the other frequency domain resource is in the deactivated state.

In a possible implementation, the physical layer destination identifier is a 16-bit bit sequence.

A second aspect discloses a communication method. The communication method may be applied to a second terminal device, or may be applied to a module (for example, a chip) in the second terminal device. The following uses an example in which the communication method is applied to the second terminal device for description. The communication method may include:

The second terminal device receives a wake-up signal from a first terminal device by using a first frequency domain resource. The first frequency domain resource is used by two or more terminal devices to transmit wake-up signals.

The second terminal device activates a second frequency domain resource based on the wake-up signal. The first frequency domain resource does not overlap the second frequency domain resource.

The second terminal device receives SL data from the first terminal device by using the second frequency domain resource.

In this embodiment of the present invention, as a receiving terminal device, the second terminal device may receive, by using one frequency domain resource, the wake-up signal from a sending terminal device (namely, the first terminal device), and then may activate, based on the wake-up signal, the frequency domain resource for transmitting the SL data, and further receive the SL data from the sending terminal device by using the frequency domain resource. It can be learned that when there is no SL data to be transmitted, the frequency domain resource for transmitting the SL data may be in a deactivated state, or when there is SL data to be transmitted, the frequency domain resource may be activated by using the wake-up signal transmitted by using one frequency domain resource. This can reduce active time of the frequency domain resource for transmitting the SL data. Because bandwidth of the frequency domain resource for transmitting the wake-up signal is far less than bandwidth of the frequency domain resource for transmitting the SL data, a frequency domain range that needs to be continuously monitored by the receiving terminal device is reduced. Therefore, power consumption of the terminal device can be reduced while normal SL transmission can be ensured. In addition, because the first frequency domain resource may be used not only by the first terminal device but also by another terminal device, in other words, the first frequency domain resource may be shared by a plurality of terminal devices, utilization of the frequency domain resource can be improved.

In a possible implementation, a modulation scheme for the wake-up signal is OOK or BPSK.

In this embodiment of the present invention, in the OOK, information is not carried by using a phase or an amplitude, but simply transmitted based on whether a signal is sent, and the receiving terminal device does not need to demodulate the wake-up signal, but only needs to be able to detect the signal through envelope detection. Therefore, the receiving terminal device only needs to include a simple receiver structure to receive the wake-up signal. A design of this type of receiver is extremely simple, can reduce hardware implementation complexity of the terminal device, and therefore can reduce power consumption of the receiving terminal device. Similarly, a wake-up signal modulated by using the BPSK may also be received by using a receiver with low power consumption.

In a possible implementation, the wake-up signal includes a first sequence. The first sequence is determined based on a physical layer destination identifier of the second terminal device. The first sequence occupies a plurality of time units.

That the second terminal device receives a wake-up signal from a first terminal device by using a first frequency domain resource includes:

The second terminal device receives the wake-up signal from the first terminal device by using the first frequency domain resource based on the physical layer destination identifier of the second terminal device.

In this embodiment of the present invention, because one sequence in the wake-up signal is determined based on the physical layer destination identifier of the receiving terminal device, the receiving terminal device may blindly detect the wake-up signal based on the physical layer destination identifier of the receiving terminal device, and then accurately receive the wake-up signal sent to the receiving terminal device. This can avoid a problem that the frequency domain resource for transmitting the SL data is incorrectly activated due to reception of a wake-up signal sent to another terminal device, and therefore avoid a false alarm. The sequence may be a bitstream including a plurality of sequence values.

In a possible implementation, the first sequence includes the physical layer destination identifier of the second terminal device.

That the second terminal device receives the wake-up signal from the first terminal device by using the first frequency domain resource based on the physical layer destination identifier of the second terminal device includes:

The second terminal device receives, by using the first frequency domain resource, the wake-up signal that is from the first terminal device and that includes the physical layer destination identifier of the second terminal device.

In this embodiment of the present invention, the receiving terminal device may determine, based on whether the wake-up signal includes the physical layer destination identifier of the receiving terminal device, whether the wake-up signal is a wake-up signal sent to the receiving terminal device. Therefore, the receiving terminal device may accurately receive the wake-up signal sent to the receiving terminal device. This can avoid the problem that the frequency domain resource for transmitting the SL data is incorrectly activated due to the reception of the wake-up signal sent to the another terminal device, and therefore avoid the false alarm.

In a possible implementation, the first sequence further includes a sequence identifier. The sequence identifier is used to identify a start location of the first sequence.

In this embodiment of the present invention, when performing blind detection, the receiving terminal device may first determine the start location of the first sequence based on the sequence identifier, and then determine, based on whether the first sequence includes the physical layer destination identifier of the receiving terminal device, whether the wake-up signal is the wake-up signal sent to the receiving terminal device. This can reduce a quantity of times the terminal device performs determining by using the physical layer destination identifier of the terminal device.

In a possible implementation, the wake-up signal further includes a second sequence. The second sequence includes a sequence obtained after the physical layer destination identifier of the second terminal device is negated. Time units occupied by the first sequence and the second sequence are the same.

That the second terminal device receives the wake-up signal from the first terminal device by using the first frequency domain resource based on the physical layer destination identifier of the second terminal device includes:

The second terminal device receives, by using the first frequency domain resource, the wake-up signal that is from the first terminal device and that includes the physical layer destination identifier of the second terminal device and the sequence obtained after the physical layer destination identifier of the second terminal device is negated.

In this embodiment of the present invention, the receiving terminal device may determine, based on whether the wake-up signal includes the physical layer destination identifier of the receiving terminal device and the sequence obtained after the physical layer destination identifier of the receiving terminal device is negated, whether the wake-up signal is the wake-up signal sent to the receiving terminal device. Therefore, the receiving terminal device may accurately receive the wake-up signal sent to the receiving terminal device. This can avoid the problem that the frequency domain resource for transmitting the SL data is incorrectly activated due to the reception of the wake-up signal sent to the another terminal device, and therefore avoid the false alarm.

In a possible implementation, the communication method may further include:

The second terminal device determines a third frequency domain resource from the first frequency domain resource based on a physical layer destination identifier of the second terminal device.

That the second terminal device receives a wake-up signal from a first terminal device by using a first frequency domain resource includes:

The second terminal device receives the wake-up signal from the first terminal device by using the third frequency domain resource.

In this embodiment of the present invention, the receiving terminal device may receive, on the frequency domain resource determined based on the physical layer destination identifier of the receiving terminal device, the wake-up signal sent to the receiving terminal device. This can avoid the problem that the frequency domain resource for transmitting the SL data is incorrectly activated due to the reception of the wake-up signal sent to the another terminal device, and therefore avoid the false alarm. In addition, the receiving terminal device only needs to detect, on the frequency domain resource determined based on the physical layer destination identifier of the receiving terminal device, the wake-up signal sent to the receiving terminal device. Therefore, bandwidth of the frequency domain resource detected by the terminal device can be reduced, and the power consumption of the terminal device can be further reduced.

In a possible implementation, the communication method may further include:

The second terminal device determines a second time domain resource from a first time domain resource based on the physical layer destination identifier of the second terminal device. The first time domain resource is a time domain resource corresponding to the first frequency domain resource. The second time domain resource is a time domain resource corresponding to the third frequency domain resource.

That the second terminal device receives the wake-up signal from the first terminal device by using the third frequency domain resource includes:

The second terminal device receives the wake-up signal from the first terminal device by using the second time domain resource and the third frequency domain resource.

In this embodiment of the present invention, the receiving terminal device may receive, on the time domain resource determined based on the physical layer destination identifier of the receiving terminal device, the wake-up signal sent to the receiving terminal device. This can avoid the problem that the frequency domain resource for transmitting the SL data is incorrectly activated due to the reception of the wake-up signal sent to the another terminal device, and therefore avoid the false alarm. In addition, the receiving terminal device only needs to detect, on the time domain resource determined based on the physical layer destination identifier of the receiving terminal device, the wake-up signal sent to the receiving terminal device. Therefore, time for the receiving terminal device to detect the wake-up signal can be reduced, and the power consumption of the terminal device can be further reduced.

In a possible implementation, that the second terminal device determines a second time domain resource from a first time domain resource based on the physical layer destination identifier of the second terminal device includes:

The second terminal device determines the second time domain resource from the first time domain resource based on P MSBs in the physical layer destination identifier of the second terminal device.

That the second terminal device determines a third frequency domain resource from the first frequency domain resource based on a physical layer destination identifier of the second terminal device includes:

The second terminal device determines the third frequency domain resource from the first frequency domain resource based on Q LSBs in the physical layer destination identifier of the second terminal device. P and Q are integers less than or equal to A. A is a quantity of bits included in the physical layer destination identifier.

In a possible implementation, the first frequency domain resource and the second frequency domain resource correspond to different radio frequency sending modules and/or radio frequency receiving modules.

In this embodiment of the present invention, the frequency domain resource for transmitting the wake-up signal and the frequency domain resource for transmitting the SL data correspond to different radio frequency sending modules and/or radio frequency receiving modules. In this case, the wake-up signal may be transmitted by using a simplified radio frequency sending and/or receiving module with low power consumption, and the SL data may be transmitted by using a radio frequency sending and/or receiving module with normal power consumption. This can further reduce power consumption for transmitting the wake-up signal. In addition, use of the different radio frequency sending modules and/or radio frequency receiving modules may further ensure that both the two frequency domain resources may be in an activated state, or one frequency domain resource is in the activated state, and the other frequency domain resource is in the deactivated state.

In a possible implementation, the physical layer destination identifier is a 16-bit bit sequence.

A third aspect discloses a communication apparatus. The communication apparatus may be a first terminal device, or may be a module (for example, a chip) of a first terminal device. The communication apparatus may include:

a sending unit, configured to send a wake-up signal to a second terminal device by using a first frequency domain resource. The wake-up signal is used to activate a second frequency domain resource. The first frequency domain resource is used by two or more terminal devices to transmit wake-up signals. The first frequency domain resource does not overlap the second frequency domain resource.

The sending unit is further configured to send SL data to the second terminal device by using the second frequency domain resource.

In a possible implementation, a modulation scheme for the wake-up signal is OOK or BPSK.

In a possible implementation, the wake-up signal includes a first sequence. The first sequence is determined based on a physical layer destination identifier of the second terminal device. The first sequence occupies a plurality of time units.

In a possible implementation, the first sequence includes the physical layer destination identifier of the second terminal device.

In a possible implementation, the wake-up signal further includes a second sequence. The second sequence includes a sequence obtained after the physical layer destination identifier of the second terminal device is negated. Time units occupied by the first sequence and the second sequence are the same.

In a possible implementation, the communication apparatus further includes:

a processing unit, configured to determine a third frequency domain resource from the first frequency domain resource based on a physical layer destination identifier of the second terminal device.

That the sending unit sends a wake-up signal to a second terminal device by using a first frequency domain resource includes:

sending the wake-up signal to the second terminal device by using the third frequency domain resource.

In a possible implementation, the processing unit is further configured to determine a second time domain resource from a first time domain resource based on the physical layer destination identifier of the second terminal device. The first time domain resource is a time domain resource corresponding to the first frequency domain resource. The second time domain resource is a time domain resource corresponding to the third frequency domain resource.

That the sending unit sends the wake-up signal to the second terminal device by using the third frequency domain resource includes:

sending the wake-up signal to the second terminal device by using the second time domain resource and the third frequency domain resource.

In a possible implementation, that the processing unit determines a second time domain resource from a first time domain resource based on the physical layer destination identifier of the second terminal device includes:

determining the second time domain resource from the first time domain resource based on P MSBs in the physical layer destination identifier of the second terminal device.

That the processing unit determines a third frequency domain resource from the first frequency domain resource based on a physical layer destination identifier of the second terminal device includes:

determining the third frequency domain resource from the first frequency domain resource based on Q LSBs in the physical layer destination identifier of the second terminal device. P and Q are integers less than or equal to A. A is a quantity of bits included in the physical layer destination identifier.

In a possible implementation, the first frequency domain resource and the second frequency domain resource correspond to different radio frequency sending modules and/or radio frequency receiving modules.

In a possible implementation, the physical layer destination identifier is a 16-bit bit sequence.

A fourth aspect discloses a communication apparatus. The communication apparatus may be a second terminal device, or may be a module (for example, a chip) of a second terminal device. The communication apparatus may include:

a receiving unit, configured to receive a wake-up signal from a first terminal device by using a first frequency domain resource, where the first frequency domain resource is used by two or more terminal devices to transmit wake-up signals; and a processing unit, configured to activate a second frequency domain resource based on the wake-up signal, where the first frequency domain resource does not overlap the second frequency domain resource.

The receiving unit is further configured to receive SL data from the first terminal device by using the second frequency domain resource.

In a possible implementation, a modulation scheme for the wake-up signal is OOK or BPSK.

In a possible implementation, the wake-up signal includes a first sequence. The first sequence is determined based on a physical layer destination identifier of the second terminal device. The first sequence occupies a plurality of time units.

That the receiving unit receives a wake-up signal from a first terminal device by using a first frequency domain resource includes:

receiving the wake-up signal from the first terminal device by using the first frequency domain resource based on the physical layer destination identifier of the second terminal device.

In a possible implementation, the first sequence includes the physical layer destination identifier of the second terminal device.

That the receiving unit receives the wake-up signal from the first terminal device by using the first frequency domain resource based on the physical layer destination identifier of the second terminal device includes:

receiving, by using the first frequency domain resource, the wake-up signal that is from the first terminal device and that includes the physical layer destination identifier of the second terminal device.

In a possible implementation, the wake-up signal further includes a second sequence. The second sequence includes a sequence obtained after the physical layer destination identifier of the second terminal device is negated. Time units occupied by the first sequence and the second sequence are the same.

That the receiving unit receives the wake-up signal from the first terminal device by using the first frequency domain resource based on the physical layer destination identifier of the second terminal device includes:

receiving, by using the first frequency domain resource, the wake-up signal that is from the first terminal device and that includes the physical layer destination identifier of the second terminal device and the sequence obtained after the physical layer destination identifier of the second terminal device is negated.

In a possible implementation, the processing unit is further configured to determine a third frequency domain resource from the first frequency domain resource based on a physical layer destination identifier of the second terminal device.

That the receiving unit receives a wake-up signal from a first terminal device by using a first frequency domain resource includes:

receiving the wake-up signal from the first terminal device by using the third frequency domain resource.

In a possible implementation, the processing unit is further configured to determine a second time domain resource from a first time domain resource based on the physical layer destination identifier of the second terminal device. The first time domain resource is a time domain resource corresponding to the first frequency domain resource. The second time domain resource is a time domain resource corresponding to the third frequency domain resource.

That the receiving unit receives the wake-up signal from the first terminal device by using the third frequency domain resource includes:

receiving the wake-up signal from the first terminal device by using the second time domain resource and the third frequency domain resource.

In a possible implementation, that the processing unit determines a second time domain resource from a first time domain resource based on the physical layer destination identifier of the second terminal device includes:

determining the second time domain resource from the first time domain resource based on P MSBs in the physical layer destination identifier of the second terminal device.

That the processing unit determines a third frequency domain resource from the first frequency domain resource based on a physical layer destination identifier of the second terminal device includes:

determining the third frequency domain resource from the first frequency domain resource based on Q LSBs in the physical layer destination identifier of the second terminal device. P and Q are integers less than or equal to A. A is a quantity of bits included in the physical layer destination identifier.

In a possible implementation, the first frequency domain resource and the second frequency domain resource correspond to different radio frequency sending modules and/or radio frequency receiving modules.

In a possible implementation, the physical layer destination identifier is a 16-bit bit sequence.

A fifth aspect discloses a communication apparatus. The communication apparatus may include a processor, a memory, an input interface, and an output interface. The input interface is configured to receive information from a communication apparatus other than the communication apparatus. The output interface is configured to output information to a communication apparatus other than the communication apparatus. When the processor executes a computer program stored in the memory, the processor is enabled to perform the communication method disclosed in the first aspect or any one of the implementations in the first aspect.

A sixth aspect discloses a communication apparatus. The communication apparatus may include a processor, a memory, an input interface, and an output interface. The input interface is configured to receive information from a communication apparatus other than the communication apparatus. The output interface is configured to output information to a communication apparatus other than the communication apparatus. When the processor executes a computer program stored in the memory, the processor is enabled to perform the communication method disclosed in the second aspect or any one of the implementations in the second aspect.

A seventh aspect discloses a first terminal device. The first terminal device may include a processor, a memory, an input interface, and an output interface. The input interface is configured to receive information from a terminal device other than the first terminal device. The output interface is configured to output information to a terminal device other than the first terminal device. When the processor executes a computer program stored in the memory, the processor is enabled to perform the communication method disclosed in the first aspect or any one of the implementations in the first aspect.

An eighth aspect discloses a second terminal device. The second terminal device may include a processor, a memory, an input interface, and an output interface. The input interface is configured to receive information from a terminal device other than the second terminal device. The output interface is configured to output information to a terminal device other than the second terminal device. When the processor executes a computer program stored in the memory, the processor is enabled to perform the communication method disclosed in the second aspect or any one of the implementations in the second aspect.

A ninth aspect discloses a communication system. The communication system includes the communication apparatus in the fifth aspect and the communication apparatus in the sixth aspect, or includes the communication apparatus in the seventh aspect and the communication apparatus in the eighth aspect.

A tenth aspect discloses a computer-readable storage medium. The computer-readable storage medium stores a computer program or computer instructions. When the computer program or the computer instructions are run, the communication method disclosed in any one of the foregoing aspects is implemented.

An eleventh aspect discloses a chip. The chip includes a processor, and is configured to execute a program stored in a memory. When the program is executed, the chip is enabled to perform the foregoing methods.

In a possible implementation, the memory is located outside the chip.

A twelfth aspect discloses a computer program product. The computer program product includes computer program code. When the computer program code is run, the foregoing communication methods are performed.

BRIEF DESCRIPTION OF DRAWINGS

FIG. 11 is a schematic diagram of a structure of a communication apparatus according to an embodiment of the present invention;

FIG. 12 is a schematic diagram of a structure of another communication apparatus according to an embodiment of the present invention;

FIG. 13 is a schematic diagram of a structure of still another communication apparatus according to an embodiment of the present invention.

DESCRIPTION OF EMBODIMENTS

Embodiments of the present invention disclose a communication method, apparatus, and system, to reduce power consumption of a terminal device on an SL. Details are separately described in the following.

Figure 1:
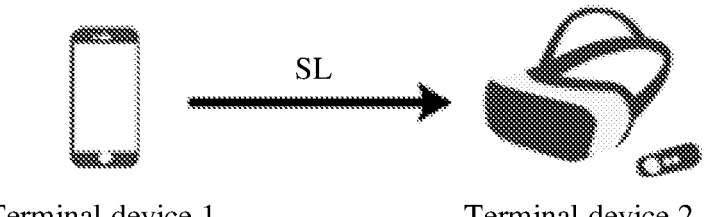
FIG. 1 is a schematic diagram of a network architecture according to an embodiment of the present invention.

To better understand embodiments of the present invention, a network architecture used in embodiments of the present invention is first described in the following. FIG. 1 is a schematic diagram of a network architecture according to an embodiment of the present invention. As shown in FIG. 1, the network architecture may include a terminal device 1 and a terminal device 2. The terminal device 1 and the terminal device 2 may communicate with each other by using an SL.

Figure 2:
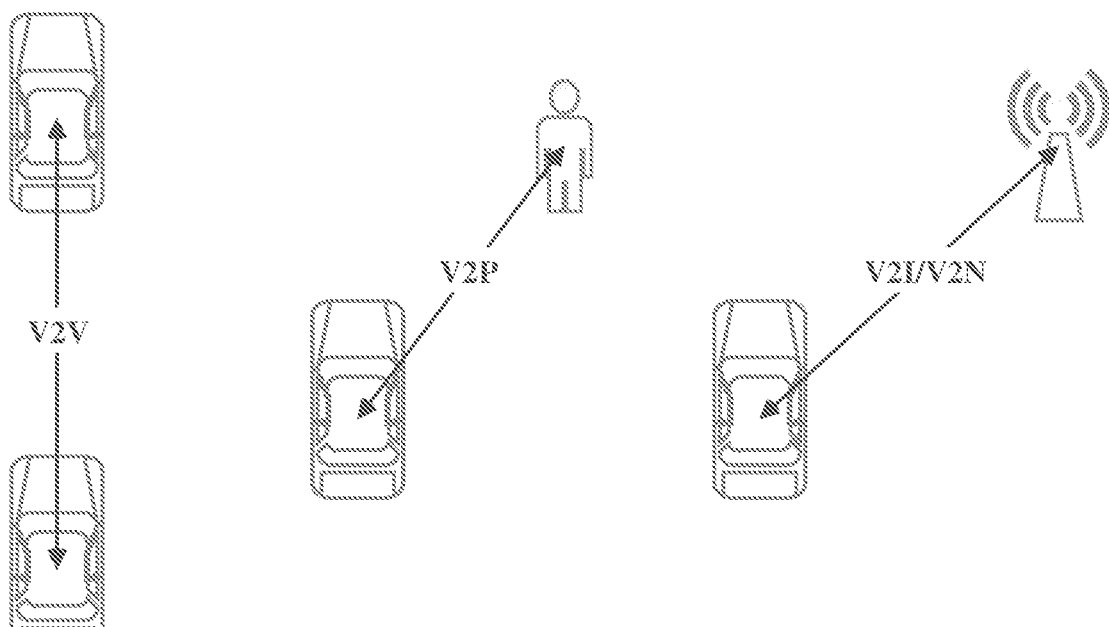
FIG. 2 is a schematic diagram of a V2X network architecture according to an embodiment of the present invention.

For example, FIG. 2 is a schematic diagram of a vehicle to everything (V2X) network architecture according to an embodiment of the present invention. As shown in FIG. 2, V2X may include vehicle to vehicle (V2V) communication, vehicle to pedestrian (V2P) communication, vehicle to infrastructure (V2I) communication, and vehicle to network (V2N) communication.

It should be understood that the terminal device 1 and the terminal device 2 may be a same device, or may be different devices.

It should be understood that the network architecture shown in FIG. 2 is only an example of the network architecture shown in FIG. 1, and does not constitute a limitation on the network architecture.

It should be understood that the network architecture shown in FIG. 2 is only an example for description, and does not constitute a limitation on the network architecture.

The terminal device may also be referred to as UE, a mobile station (mobile station, MS), a mobile terminal (MT), or the like, and is a device that provides voice and/or data connectivity for a user. The terminal device may be a handheld terminal, a notebook computer, a subscriber unit, a cellular phone, a smartphone, a wireless data card, a personal digital assistant (PDA) computer, a tablet computer, a wireless modem, a handheld device, a laptop computer, a cordless phone or a wireless local loop (WLL) station, a machine type communication (MTC) terminal, a wearable device (for example, a smartwatch, a smart band, or a pedometer), a vehicle-mounted device (for example, an automobile, a bicycle, an electric vehicle, an aircraft, a ship, a train, or a high-speed train), a virtual reality (VR) device, an augmented reality (AR) device, a wireless terminal in industrial control, a smart home device (for example, a refrigerator, a television, an air conditioner, or an electricity meter), an intelligent robot, a workshop device, a wireless terminal in self driving, a wireless terminal in remote medical surgery, a wireless terminal in a smart grid, a wireless terminal in transportation safety, a wireless terminal in a smart city, a wireless terminal in a smart home, a flight device (for example, an intelligent robot, a hot balloon, an unmanned aerial vehicle, or an aircraft), or another device that can access a network.

To better understand embodiments of the present invention, the following first describes conventional technologies of embodiments of the present invention.

In the past several decades, wireless communication systems undergone a technical evolution from the 1st generation analogue communication technology to the 5th generation mobile communication technology (5th generation, 5G), namely, new radio (NR). Driven by an increasingly expanding information transmission requirement, software and hardware complexity of the wireless communication system greatly increases. The increase in complexity directly causes a great increase in power consumption of a terminal device. In this case, if there is no effective energy saving technology, user experience of an NR system is significantly degraded. In view of this, energy saving becomes one of important technical enhancement directions of the current NR system. In the NR system, a communication interface between a network device and user equipment (UE) is referred to as a Uu interface. There are two types of energy-saving solutions for the NR Uu interface: dynamically adjusting operating bandwidth of the UE in a frequency domain and dynamically adjusting operating time of the UE in a time domain. A core idea of the two methods is: A radio resource is dynamically adjusted based on an information transmission requirement of the UE, and the UE enables hardware only on a resource of a proper size. This can prevent the UE from still operating with high power consumption when the information transmission requirement is low, and therefore reduce average power consumption.

Figures 3, 4:
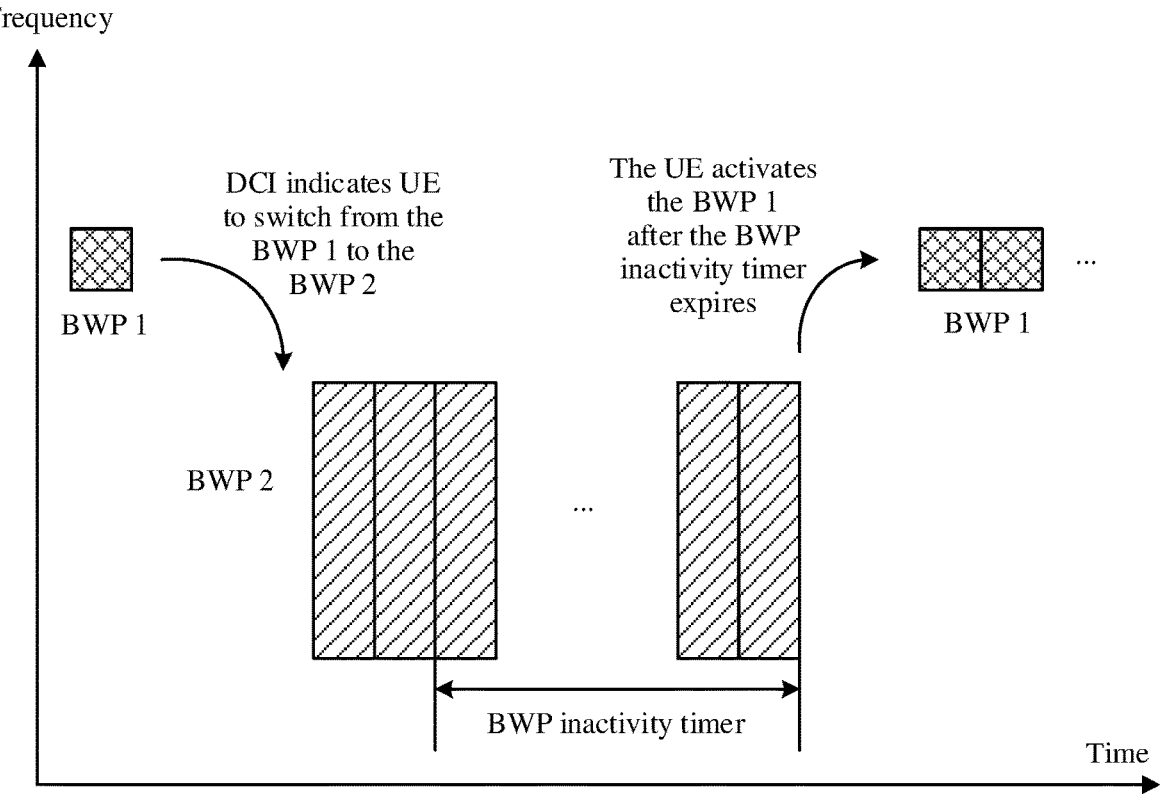
FIG. 3 is a schematic diagram of activating a BWP according to an embodiment of the present invention.
FIG. 4 is a schematic diagram of waking up UE based on a WUS according to an embodiment of the present invention.

Specifically, energy saving may be implemented by using a bandwidth part (BWP) in the frequency domain. The BWP is a method introduced in NR and used to represent a size of a frequency domain resource used by a communication link. In an uplink (UL) or a downlink (DL), a maximum of four BWPs may be configured for the UE, but there is only one activated BWP for the UE at a same moment. Bandwidth corresponding to the BWPs may be different. Smaller bandwidth corresponding to the activated BWP for the UE indicates lower power consumption of the UE. Therefore, different BWPs may be activated based on different information transmission requirements of the UE. This can reduce the average power consumption of the UE. FIG. 3 is a schematic diagram of activating a BWP according to an embodiment of the present invention. As shown in FIG. 3, the UE initially operates on a BWP 1. When the information transmission requirement of the UE increases, a 5G NodeB (next generation NodeB, gNB) may indicate, by using downlink control information (DCI), the UE to switch from the BWP 1 to a BWP 2 with large bandwidth, that is, activate the BWP 2. In addition, the gNB may further configure a BWP inactivity timer for the UE. When the UE does not have a high information transmission requirement on the BWP 2 for a period of time, the UE may activate the BWP 1. This can save energy. It should be understood that there are a plurality of methods for implementing BWP activation in the NR system. The method shown in FIG. 3 is only used as an example for description, and does not constitute a limitation.

A typical technology for energy saving in the time domain is a wake-up signal (wake-up signal, WUS). When the UE does not have an information transmission requirement in a period of time, the UE may enter a sleep state, and disable radio frequency hardware. This can significantly reduce power consumption. When there is an information transmission requirement on the Uu interface, the gNB may send the DCI including the WUS to the UE, to wake up the UE. This can reduce impact on normal information transmission caused by an energy saving technology. FIG. 4 is a schematic diagram of waking up UE based on a WUS according to an embodiment of the present invention. As shown in FIG. 4, the UE receives the WUS from the gNB before each time period. When content of the WUS is "1", it indicates that the UE needs to be woken up in the time period, to send or receive information, or activate a discontinuous reception (DRX) cycle to monitor a physical downlink control channel (PDCCH) at specific time, and perform a subsequent operation based on the DCI. Correspondingly, when content of the WUS is "0", it indicates that the UE may sleep in the time period. Based on the WUS, the NR system can greatly reduce the power consumption of the UE in an occasional transmission scenario, and therefore save energy.

In the wireless communication system, in addition to the foregoing Uu interface, there is a PC5 interface that is a communication interface between UEs. A transmission link in the interface is defined as the SL. An NR SL technology is an important support technology for 5G V2X and device-to-device (D2D) communication. Similar to the Uu interface, energy saving is also one of important technical enhancement directions of an NR SL system.

Different from the Uu interface, the PC5 interface allows only one SL BWP to be configured for the UE. When the SL BWP is in an activated state, the UE sends or receives information such as SL data, control information, broadcast information, and feedback information on the SL BWP. When the SL BWP is in a deactivated state, the UE does not send or receive any information on the SL BWP.

Figure 5:
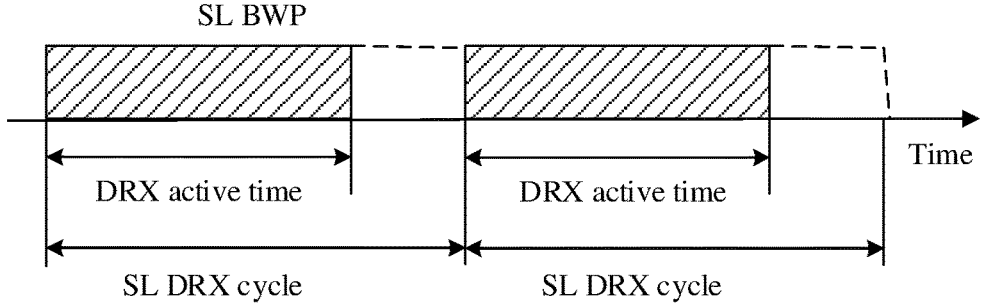
FIG. 5 is a schematic diagram of saving energy based on SL DRX according to an embodiment of the present invention.

For the SL BWP in the activated state, an SL DRX mechanism is introduced. An SL DRX cycle with a specific length of time may be configured for the UE. In the SL DRX cycle, the UE continuously monitors a physical sidelink control channel (PSCCH) and selectively receives a physical sidelink shared channel (PSSCH) only in DRX active time, and does not monitor the PSCCH or receive the PSSCH within the remaining time of the SL DRX cycle. FIG. 5 is a schematic diagram of saving energy based on SL DRX according to an embodiment of the present invention. As shown in FIG. 5, when the SL BWP is in the activated state, in the SL DRX cycle repeated in the time domain, the UE performs receiving in part of time, and does not perform receiving in the remaining time. This can reduce the average power consumption. The UE may reduce time for monitoring the PSCCH, to reduce radio frequency power consumption and decoding power consumption for monitoring the PSCCH. This can preliminarily save energy. It should be noted that the PSCCH is a physical layer channel mainly used to transmit SL control information, and the PSSCH is a physical layer channel mainly used to transmit SL data information.

In the foregoing manner, the UE needs to continuously monitor the PSCCH and perform decoding in the SL DRX active time, and potentially decodes some PSSCHs. This continuously consumes energy, and consequently causes high power consumption of the UE. When a service is an occasional service, the SL data is transmitted only occasionally, and the SL data is not transmitted in most cases. Therefore, a waste of power consumption is caused.

Figure 6:
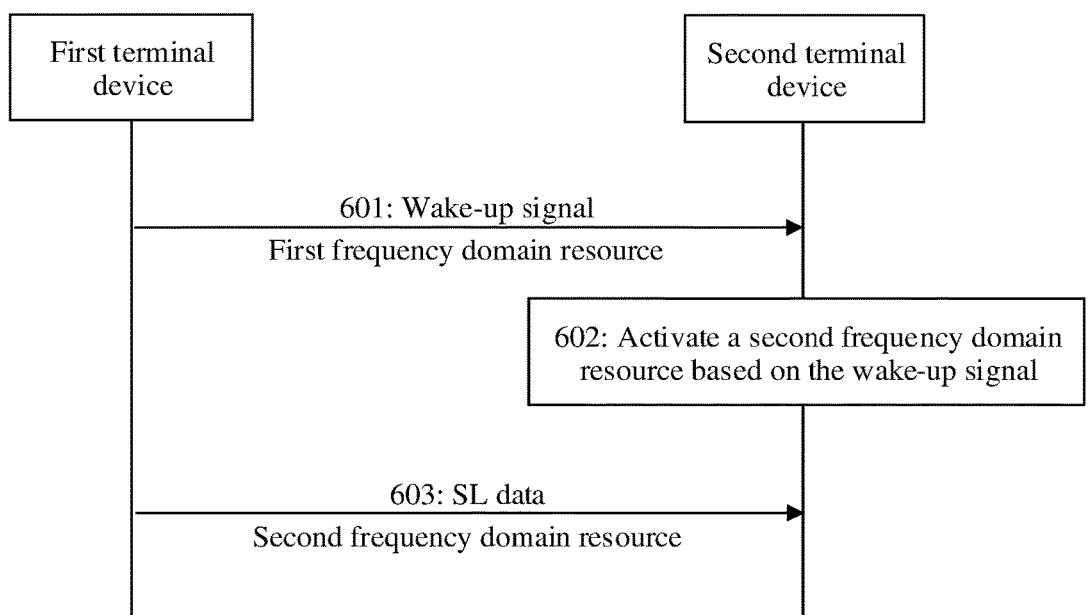
FIG. 6 is a schematic flowchart of a communication method according to an embodiment of the present invention.

Based on the foregoing network architecture, FIG. 6 is a schematic flowchart of a communication method according to an embodiment of the present invention. As shown in FIG. 6, the communication method may include the following steps.

601: A first terminal device sends a wake-up signal to a second terminal device by using a first frequency domain resource.

Correspondingly, the second terminal device receives the wake-up signal from the first terminal device by using the first frequency domain resource.

The wake-up signal may be carried on a physical sidelink control channel (PSCCH) for transmission, may be carried on a physical sidelink shared channel (PSSCH) for transmission, or may be carried on another sidelink channel for transmission. This is not limited herein.

Sending to the second terminal device by using the first frequency domain resource may be understood as sending to the second terminal device on the first frequency domain resource.

602: The second terminal device activates a second frequency domain resource based on the wake-up signal.

A sending terminal device and a receiving terminal device need to transmit information such as SL data, SL control information, an SL reference signal, SL feedback information, and SL synchronization information on a same frequency domain resource. Based on an energy saving requirement, when a frequency domain resource of the receiving terminal device does not need to be used to transmit (that is, receive and/or send) the SL data, a status of the frequency domain resource may be switched from an activated state to a deactivated state. The frequency domain resource herein is the following second frequency domain resource.

Therefore, when the first terminal device has SL data to be sent to the second terminal device, the first terminal device may send the wake-up signal to the second terminal device by using the first frequency domain resource. The wake-up signal is used to activate the second frequency domain resource. That the first frequency domain resource does not overlap the second frequency domain resource may be understood as that there is no same frequency domain resource between the first frequency domain resource and the second frequency domain resource, or may be understood as that there is no intersection between the first frequency domain resource and the second frequency domain resource. Bandwidth of the first frequency domain resource is far less than bandwidth of the second frequency domain resource. Therefore, power consumption of the second terminal device for transmitting information by using the first frequency domain resource is far lower than power consumption for transmitting information by using the second frequency domain resource. In this case, power consumption of the first terminal device and the second terminal device can be reduced. The first frequency domain resource may be configured by a network device, may be preconfigured, or may be configured by default. The second frequency domain resource may be configured by the network device, may be preconfigured, or may be configured by default.

It should be understood that the first frequency domain resource may be a frequency domain resource specially used to transmit the wake-up signal, and the second frequency domain resource may be a frequency domain resource specially used to transmit information that is not a wake-up signal, for example, the SL data and/or the SL control information. The first frequency domain resource may be used by two or more terminal devices to transmit wake-up signals, and is not used for transmitting the wake-up signal only between the first terminal device and the second terminal device.

The wake-up signal may be the foregoing WUS, or may be indication information. The indication information may indicate to activate the second frequency domain resource, or may indicate the second terminal device to receive the SL data from the first terminal device by using the second frequency domain resource.

In a case, the first terminal device may determine a status of the second frequency domain resource in the second terminal device. The status of the second frequency domain resource includes an activated state and a deactivated state. When the status of the second frequency domain resource in the second terminal device is the activated state, the second terminal device can transmit the SL data to another terminal device by using the second frequency domain resource. When the status of the second frequency domain resource in the second terminal device is the deactivated state, the second terminal device cannot transmit the SL data to another terminal device by using the second frequency domain resource.

When the first terminal device has the SL data to be sent to the second terminal device, the first terminal device may first determine the status of the second frequency domain resource in the second terminal device. When the status of the second frequency domain resource in the second terminal device is the deactivated state, the first terminal device may send the wake-up signal to the second terminal device by using the first frequency domain resource. When the status of the second frequency domain resource in the second terminal device is the activated state, the first terminal device may not send the wake-up signal to the second terminal device by using the first frequency domain resource. This can reduce a quantity of information transmissions, and therefore save a transmission resource.

In another case, the first terminal device cannot determine a status of the second frequency domain resource in the second terminal device. Therefore, to ensure that the second terminal device can receive the SL data from the first terminal device, when the first terminal device has the SL data to be sent to the second terminal device, the first terminal device may directly send the wake-up signal to the second terminal device by using the first frequency domain resource.

Correspondingly, the second terminal device may receive the wake-up signal from the first terminal device, and then may activate the second frequency domain resource based on the wake-up signal. When the second terminal device receives the wake-up signal from the first terminal device, if the second frequency domain resource is already in an activated state, activating the second frequency domain resource based on the wake-up signal may be understood as determining, based on the wake-up signal, that the SL data from the first terminal device needs to be received by using the second frequency domain resource. If the second frequency domain resource is in a deactivated state, activating the second frequency domain resource based on the wake-up signal may be understood as switching the status of the second frequency domain resource from the deactivated state to the activated state.

A modulation scheme for the wake-up signal may be OOK, or may be BPSK. In the OOK, information is not carried by using a phase or an amplitude, but simply transmitted based on whether a signal is sent, and the receiving terminal device does not need to demodulate the wake-up signal, but only needs to be able to detect the signal through envelope detection. A design of this type of receiver is extremely simple, and power consumption is low. Similarly, a wake-up signal modulated by using the BPSK may also be received by using a receiver with low power consumption. It can be learned that the first terminal device modulates the signal by using the OOK or BPSK, so that hardware implementation complexity of the terminal device is reduced, and power consumption of the terminal device can be reduced. In addition, average power consumption of the second terminal device can be further reduced.

The first frequency domain resource may be used by two or more terminal devices to transmit wake-up signals. Therefore, when the wake-up signal is transmitted by using the first frequency domain resource, the wake-up signal may be received by a plurality of terminal devices. However, the wake-up signal may be sent to only one of the plurality of terminal devices. Therefore, it is extremely important how the receiving terminal device determines that a received wake-up signal is a wake-up signal sent to the receiving terminal device. The foregoing problem may be resolved in two manners. The following describes the two manners in detail.

In one manner, the wake-up signal may include a first sequence, the first sequence may be determined based on a physical layer destination identifier (layer-1 destination identifier) of the second terminal device, and the first sequence may occupy a plurality of time units. The time units may be slots, may be symbols or may be other units that may represent a time domain resource. It should be understood that the sequence may include a plurality of sequence values. The sequence values may be further represented as bit values, namely, a binary number 0 or 1. The sequence may be a bitstream. One time unit may transmit one bit value in the first sequence.

It should be understood that the first sequence may alternatively be determined based on other information that can uniquely identify the second terminal device. For example, the first sequence may be determined based on a higher-layer identifier of the second terminal device. It can be learned that the physical layer destination identifier of the second terminal device may be replaced with the other information that can uniquely identify the second terminal device.

It should be understood that the physical layer destination identifier is a method for distinguishing different terminal devices at a physical layer in an NR SL system. Each terminal device in the NR SL system has a unicast service-oriented physical layer destination identifier of the terminal device, and correspondingly, further has a multicast service-oriented physical layer destination identifier of a user group.

The second terminal device may receive the wake-up signal from the first terminal device by using the first frequency domain resource based on the physical layer destination identifier of the second terminal device. After receiving the wake-up signal from the first terminal device, the second terminal device may first determine whether the wake-up signal is a wake-up signal generated based on the physical layer destination identifier of the second terminal device. When determining that the wake-up signal is the wake-up signal generated based on the physical layer destination identifier of the second terminal device, the second terminal device may determine that the wake-up signal is a wake-up signal sent to the second terminal device, and then may activate the second frequency domain resource based on the wake-up signal. It can be learned that the second terminal device may determine, based on the physical layer destination identifier of the second terminal device, the wake-up signal sent to the second terminal device, and then respond only to the wake-up signal transmitted to the second terminal device. This can reduce an unnecessary operation, and further reduce the power consumption of the second terminal device.

The first sequence may include the physical layer destination identifier of the second terminal device. The second terminal device may receive, by using the first frequency domain resource, the wake-up signal that is from the first terminal device and that includes the physical layer destination identifier of the second terminal device. To be specific, the second terminal device may determine whether the wake-up signal includes the physical layer destination identifier of the second terminal device. When determining that the wake-up signal includes the physical layer destination identifier of the second terminal device, the second terminal device may determine that the wake-up signal is the wake-up signal sent to the second terminal device.

The first sequence may further include a sequence identifier. The sequence identifier is used to identify a start location of the first sequence. When performing blind detection, the second terminal device may first determine the start location of the first sequence based on the sequence identifier. To be specific, the second terminal device may first determine a location of the sequence identifier, and may determine a start location of the sequence identifier as a location of the first sequence. Then, the second terminal device may determine, based on whether the first sequence includes the physical layer destination identifier of the second terminal device, whether the wake-up signal is the wake-up signal sent to the second terminal device. To be specific, the second terminal device may determine whether a part after the sequence identifier includes the physical layer destination identifier of the second terminal device. For example, when the physical layer destination identifier is a 16-bit bit sequence, the second terminal device may determine whether 16 bits that are after and adjacent to the sequence identifier include the physical layer destination identifier of the second terminal device. It should be understood that, to reduce the power consumption of the second terminal device, a quantity of sequence values included in the sequence identifier may be less than a quantity of sequence values included in the first sequence.

The wake-up signal may further include a second sequence. The second sequence may include a sequence obtained after the physical layer destination identifier of the second terminal device is negated. The second device may receive, by using the first frequency domain resource, the wake-up signal that is from the first terminal device and that includes the physical layer destination identifier of the second terminal device and the sequence obtained after the physical layer destination identifier of the second terminal device is negated. To be specific, the second terminal device may determine whether the wake-up signal includes the physical layer destination identifier of the second terminal device and the sequence obtained after the physical layer destination identifier of the second terminal device is negated. When determining that the wake-up signal includes the physical layer destination identifier of the second terminal device and the sequence obtained after the physical layer destination identifier of the second terminal device is negated, the second terminal device may determine that the wake-up signal is the wake-up signal sent to the second terminal device. If time units occupied by the first sequence and the second sequence are the same, it indicates that the first sequence and the second sequence have a same length. In other words, a quantity of sequence values included in the first sequence and a quantity of sequence values included in the second sequence are the same.

The second sequence may further include a sequence identifier. The sequence identifier is used to identify a start location of the second sequence.

It should be understood that the wake-up signal may include one sequence, or may include a plurality of sequences. When the wake-up signal includes a plurality of sequences, the wake-up signal may include only two sequences, namely, the first sequence and the second sequence, or may include three or more sequences. The sequences included in the wake-up signal may have a same length. When the wake-up signal includes a plurality of sequences, each sequence may include a sequence identifier.

One sequence included in the wake-up signal may be transmitted by using one frequency domain unit in the first frequency domain resource. When the wake-up signal includes one sequence, the first terminal device may transmit the sequence in the wake-up signal by using one frequency domain unit in the first frequency domain resource. When the wake-up signal includes a plurality of sequences, the first terminal device may transmit M sequences by using M frequency domain units in the first frequency domain resource. Each frequency domain unit may transmit one sequence. Sequences transmitted by using different frequency domain units may be the same or different. When the sequences transmitted by the different frequency domain units may be the same, M is greater than or equal to a quantity of sequences included in the wake-up signal. When the sequences transmitted by the different frequency domain units are different, M is equal to a quantity of sequences included in the wake-up signal. The frequency domain unit herein may be one subcarrier, may be a plurality of subcarriers, or may be at another frequency domain granularity.

One sequence may occupy N*K time domain resources. N is the quantity of sequence values included in the sequence. K is a quantity of time domain resources occupied by a single sequence value. In other words, any sequence value in the wake-up signal may be represented by using K time domain resources. N is an integer greater than or equal to 2. K is an integer greater than or equal to 1. K may be 1, 12, 14, or another value. The time domain resource herein may be an orthogonal frequency division multiplexing (orthogonal frequency division multiplexing, OFDM) symbol, or may be another symbol. One sequence value is represented by using a plurality of OFDM symbols. This helps design and implement a module of the terminal device. The K time domain resources are the foregoing time unit. In other words, the time unit includes the K time domain resources.

The sequence included in the wake-up signal may use a preset sequence whose length is S as first S sequence values. S is an integer greater than or equal to 2. A value of the preset sequence may be a default value in a system, or may be preconfigured. For example, when detecting, on the first frequency domain resource, one or more preset sequences whose lengths are S, the second terminal device may determine that the first terminal device starts to send the wake-up signal on the first frequency domain resource. This can avoid a problem that the receiving terminal device cannot learn of a start time point and an end time point for transmitting the wake-up signal.

Figure 7:
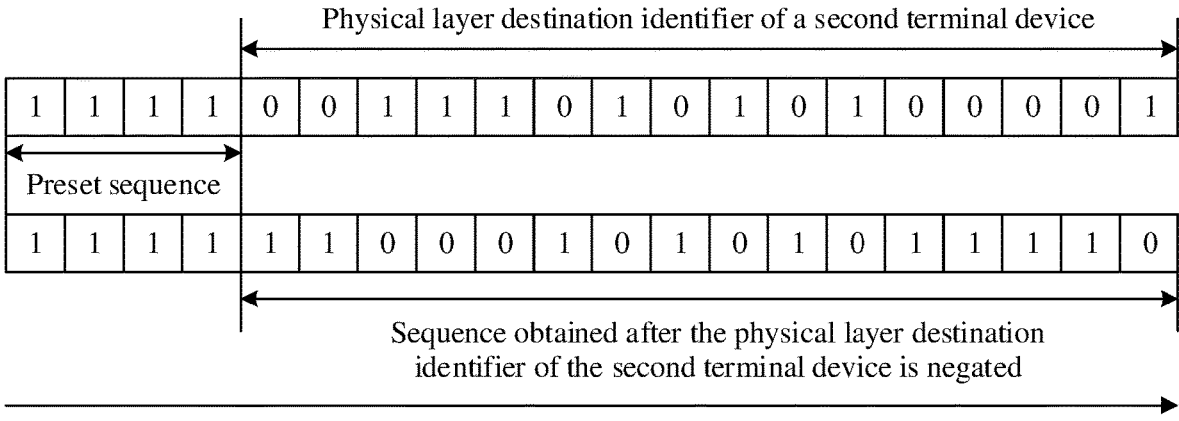
FIG. 7 is a schematic diagram of a sequence included in a wake-up signal according to an embodiment of the present invention.

For example, FIG. 7 is a schematic diagram of a sequence included in a wake-up signal according to an embodiment of the present invention. It is assumed that the wake-up signal includes the first sequence and the second sequence. As shown in FIG. 7, the wake-up signal that the first terminal device sends to the second terminal device includes two sequences. The physical layer destination identifier $\{d_0, d_1, d_2, \ldots, d_{15}\}$ of the second terminal device is $\{0, 0, 1, 1, 1, 0, 1, 0, 1, 0, 1, 0, 0, 0, 0, 1\}$. The preset sequence $\{h_0, h_1, h_2, h_3\}$ is $\{1, 1, 1, 1\}$. In this case, two sequences transmitted on two frequency domain units are respectively $\{1, 1, 1, 1, 0, 0, 1, 1, 1, 0, 1, 0, 1, 0, 1, 0, 0, 0, 0, 1\}$ and $\{1, 1, 1, 1, 1, 0, 0, 0, 1, 0, 1, 0, 1, 0, 1, 1, 1, 1, 1, 0\}$.

It can be learned that the wake-up signal includes the first sequence and the second sequence. This can avoid a problem that when the receiving terminal device determines, only by detecting whether a value of a corresponding sequence is 1, whether the wake-up signal is the wake-up signal sent to the receiving terminal device, if the physical layer destination identifier of the second terminal device is a sequence that includes all Is, the wake-up signal wakes up a plurality of terminal devices at the same time. That is, a false alarm can be avoided. In addition, a start of the sequence may be further accurately determined, to avoid a problem of false wake-up caused by a partial overlap of sequences corresponding to wake-up signals sent to different terminal devices.

When deactivation of the second frequency domain resource needs to be indicated by the first terminal device, the preset sequence whose length is S may be further used to distinguish whether the sending terminal device needs to activate the second frequency domain resource of the receiving terminal device or needs to deactivate the second frequency domain resource of the receiving terminal device. In this case, the wake-up signal not only has a function of activating the second frequency domain resource, but also has a function of deactivating the second frequency domain resource. After sending the SL data to the second terminal device, the first terminal device may send, to the second terminal device, a wake-up signal used to deactivate the second frequency domain resource. For example, a preset sequence that includes all is may indicate that the sending terminal device needs to activate the second frequency domain resource of the receiving terminal device. A preset sequence that includes 1s and 0s arranged at intervals may indicate that the sending terminal device needs to deactivate the second frequency domain resource of the receiving terminal device.

The first terminal device may send one sequence in a plurality of consecutive time units by using one frequency domain unit. For example, if a sequence is 011, the first terminal device may first transmit 0 in one time unit in one frequency domain unit, then transmit 1 in a next adjacent time unit, and continue to transmit 1 in a next adjacent time unit.

When the wake-up signal includes only one sequence transmitted by using one frequency domain unit in the first frequency domain resource, and the sequence includes the first sequence determined based on the physical layer destination identifier of the second terminal device, the first sequence may include n sequence values. n is greater than A. A is a quantity of bits included in the physical layer destination identifier of the second terminal device. The physical layer destination identifier that is of the second terminal device and that includes A bits may be extended to the first sequence whose length is n in a redundancy coding manner. Based on redundancy coding, the first sequence includes several check bits determined based on the physical layer destination identifier of the second terminal device. The several check bits are used to help the second terminal device determine that the wake-up signal is sent to the second terminal device, to avoid the false alarm. It should be understood that the foregoing redundancy coding manner is not specifically limited herein.

For example, the first sequence uses A bit values corresponding to the physical layer destination identifier of the second terminal device as first A sequence values, and then remaining n–A sequence values are generated based on the physical layer destination identifier of the second terminal device in the redundancy coding manner. The redundancy coding manner is described by using a generator polynomial $g(x)=g_0+g_1x+g_2x^2+ \ldots +g_Rx^R$. A value of $g_i$ is 0 or 1, and R is a power corresponding to the generator polynomial. For example, a generator polynomial with the power R=3 may be $g(x)=1+x+x^3$.

In the other manner, the first terminal device may determine a third frequency domain resource from the first frequency domain resource based on a physical layer destination identifier of the second terminal device, the second terminal device may determine the third frequency domain resource from the first frequency domain resource based on the physical layer destination identifier of the second terminal device, the first terminal device may send the wake-up signal to the second terminal device by using the third frequency domain resource, and correspondingly, the second terminal device may receive the wake-up signal from the first terminal device by using the third frequency domain resource.

It can be learned that the frequency domain resource for transmitting the wake-up signal to the second terminal device is determined based on the physical layer destination identifier of the second terminal device. In other words, the frequency domain resource for sending the wake-up signal to a terminal device is determined based on the physical layer destination identifier of the terminal device. Therefore, it can be ensured that different frequency domain resources are used to send wake-up signals to different terminal devices. Correspondingly, the different terminal devices may receive, by using the different frequency domain resources, the wake-up signals sent to the terminal devices. Therefore, the receiving terminal device can receive the wake-up signal sent to the receiving terminal device only by receiving the wake-up signal from the frequency domain resource corresponding to the receiving terminal device. This can reduce bandwidth for receiving the wake-up signal, and determine the wake-up signal sent to the receiving terminal device, to reduce power consumption and avoid a problem that one terminal device receives a wake-up signal sent to another terminal device, thereby avoiding a false alarm. The different frequency domain resources herein may be understood as completely different, or may be understood as partially different.

The third frequency domain resource may be determined by the first terminal device when the first terminal device has the SL data to be sent to the second terminal device, or may be determined in or after a process that the first terminal device and the second terminal device establish a unicast connection, or may be determined at other time. The third frequency domain resource may be determined by the second terminal device in or after the process that the first terminal device and the second terminal device establish the unicast connection.

It can be learned that because a correspondence between the physical layer destination identifier of the receiving terminal device and the frequency domain resource for transmitting the wake-up signal to the receiving terminal device is established, the sending terminal device does not need to explicitly use the physical layer destination identifier of the receiving terminal device as content of the wake-up signal, but uniquely determines, based on the physical layer destination identifier of the receiving terminal device, one frequency domain resource for transmitting the wake-up signal to the receiving terminal device. The sending terminal device can effectively limit a wake-up target to the receiving terminal device having a specific physical layer destination identifier, and therefore a problem that another terminal device is woken up due to the false alarm is avoided. In addition, the receiving terminal device monitors the wake-up signal only on a time-frequency resource corresponding to the physical layer destination identifier of the receiving terminal device. In this way, the receiving terminal device can distinguish the wake-up signals transmitted to the different terminal devices, and then respond only to the wake-up signal transmitted to the receiving terminal device.

In addition, the first terminal device may further determine a second time domain resource from a first time domain resource based on the physical layer destination identifier of the second terminal device. The second terminal device may further determine the second time domain resource from the first time domain resource based on the physical layer destination identifier of the second terminal device. The first terminal device may send the wake-up signal to the second terminal device by using the second time domain resource and the third frequency domain resource. Correspondingly, the second terminal device receives the wake-up signal from the first terminal device by using the second time domain resource and the third frequency domain resource. The first time domain resource is a time domain resource corresponding to the first frequency domain resource. The second time domain resource is a time domain resource corresponding to the third frequency domain resource.

A method for determining the second time domain resource is similar to a method for determining the third frequency domain resource. Details are not described herein again.

Some or all of start points of the first time domain resource may be the same as a start point of a radio frame that meets a first condition. For example, the first condition may be (SFN mod Z)=0. SFN represents a system frame number (SFN). mod represents a modulo operation. A value of Z is one of the following: {16, 32, 64, 128}. It can be learned that, by using the first condition, both the sending terminal device and the receiving terminal device determine that start points of transmitting the wake-up signal are start points of 1024/Z radio frames in a cycle of Z in every 1024 radio frames.

The first terminal device and the second terminal device may determine the second time domain resource from the first time domain resource based on P most significant bits (MSBs) in the physical layer destination identifier of the second terminal device, and may determine the third frequency domain resource from the first frequency domain resource based on Q least significant bits (LSBs) in the physical layer destination identifier of the second terminal device. Alternatively, the first terminal device and the second terminal device may determine the second time domain resource from the first time domain resource based on P least significant bits in the physical layer destination identifier of the second terminal device, and may determine the third frequency domain resource from the first frequency domain resource based on Q most significant bits in the physical layer destination identifier of the second terminal device. P is an integer less than or equal to A. A is a quantity of bits included in the physical layer destination identifier. Q is an integer less than or equal to A. When a sum of P and Q is greater than A, redundancy is generated. When a sum of P and Q is less than A, a false alarm is generated. Therefore, the sum of P and Q may preferably be A.

The first time domain resource may include T time-domain units. The first frequency domain resource may include F frequency domain units. The second time domain resource may include X time-domain units. The third frequency domain resource may include Y frequency domain units. X, Y, T, and F are all integers greater than or equal to 1. T is greater than X. F is greater than Y A granularity of the time-domain unit may be a slot (slot), may be a millisecond (ms), may be K symbols, or may be another unit that can represent the time domain resource. The symbol may be an OFDM symbol, or may be another symbol. This is not limited herein. A granularity of the frequency domain unit may be a subcarrier, may be a physical resource block (PRB), or may be another unit that can represent the frequency domain resource.

It can be learned that P bits of the physical layer destination identifier of the receiving terminal device may be represented by using locations of the X time-domain units, and Q bits of the physical layer destination identifier of the receiving terminal device may be represented by using locations of the Y frequency domain units. This helps the receiving terminal device determine whether the wake-up signal is the wake-up signal transmitted to the receiving terminal device.

For example, the first terminal device and the second terminal device may determine location indexes $x_1$ and $x_2$ of the X time-domain units in the T time-domain units based on the P MSBs in the physical layer destination identifier of the second terminal device. A decimal value of the P MSBs $\{d_0, d_1, d_2, \ldots, d_{P-1}\}$ of the physical layer destination identifier may be represented as $$D_1 = \sum_{i=0}^{P-1} \left(2^{P-1-i} d_i\right).$$

A relationship between $D_1$ and $x_1$ and $x_2$ may be represented as follows:

$$D_1 = x_1 + \sum_{i=1}^{x_2-x_1} (T+1-i) - T$$

$x_1$ and $x_2$ are integers that meet $0 \leq x_1 \leq x_2 \leq T-1$ and $$x_1 + \sum_{i=1}^{x_2-x_1} (T+1-i) - T \leq \sum_{i=0}^{P-1} \left(2^{P-1-i}\right).$$

The first terminal device and the second terminal device may determine location indexes $y_1$ and $y_2$ of the Y frequency domain units in the F frequency domain units based on the Q LSBs in the physical layer destination identifier of the second terminal device. A decimal value of the Q LSBs $\{d_{A-Q}, d_{A-Q+1}, d_{A-Q+2}, \ldots, d_{A-1}\}$ of the physical layer destination identifier may be represented as $$D_2 = \sum_{i=A-Q}^{A-1} \left(2^{A-1-i}d_i\right).$$

A relationship between $D_2$ and $y_1$ and $y_2$ may be represented as follows:

$$D_2 = y_1 + \sum_{i=1}^{y_2-y_1} (F+1-i) - F$$

$y_1$ and $y_2$ are integers that meet $0 \leq y_1 \leq y_2 \leq F-1$ and $$y_1 + \sum_{i=1}^{y_2-y_1} (F+1-i) - F \leq \sum_{i=A-Q}^{A-1} \left(2^{A-1-i}\right).$$

$d_i$ may be 0, or may be 1.

It should be understood that the foregoing two formulas are only examples for description, and do not constitute a limitation.

Figure 8:
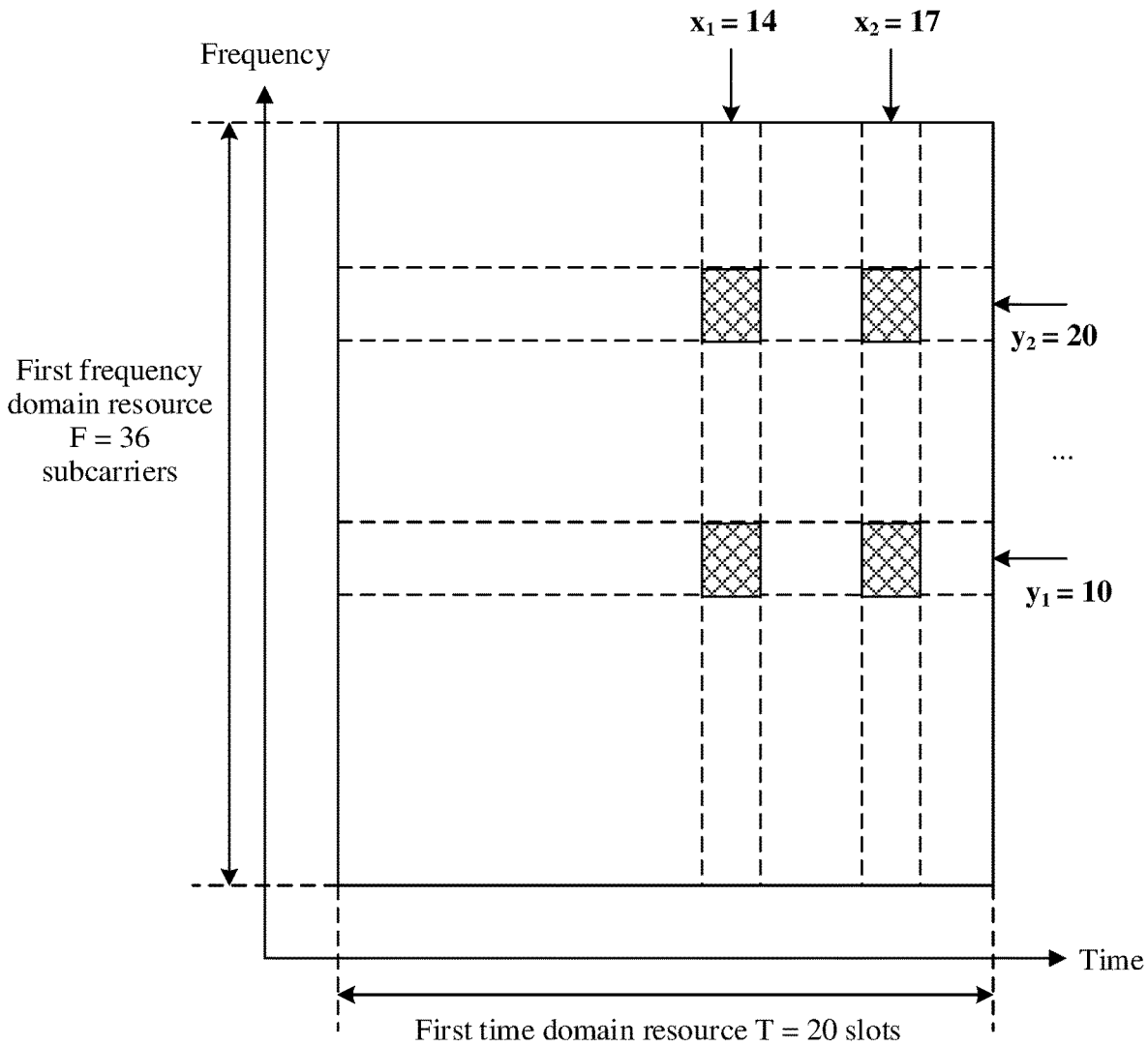
FIG. 8 is a schematic diagram of a first time domain resource and a first frequency domain resource according to an embodiment of the present invention.

For example, FIG. 8 is a schematic diagram of a first time domain resource and a first frequency domain resource according to an embodiment of the present invention. It is assumed that the time-domain unit is a slot, the frequency domain unit is a subcarrier, T is 20, F is 36, A is 16, P is 7, and Q is 9. The physical layer destination identifier $\{d_0, d_1, d_2, \ldots, d_{15}\}$ of the second terminal device is $\{0, 1, 1, 0, 0, 1, 1, 1, 0, 0, 1, 0, 0, 0, 0, 1\}$. Therefore, seven MSBs $\{d_0, d_1, \ldots, d_6\}$ are $\{0, 1, 1, 0, 0, 1, 1\}$, nine LSBs $\{d_7, d_8, \ldots, d_{15}\}$ are $\{1, 0, 0, 1, 0, 0, 0, 0, 1\}$, $D_1=51$, and $D_2=289$. According to the foregoing function relationship, $x_1=14$, $x_2=17$, $y_1=10$, and $y_2=20$. Therefore, the first terminal device may transmit the wake-up signal on the following four time-frequency resources: $(x_1, y_1)=(14,10)$, $(x_1, y_2)=(14,20)$, $(x_2, y_1)=(17,20)$, and $(x_2, y_2)=(17,20)$. The second terminal device may monitor the wake-up signal on the four time-frequency resources, and activate the second frequency domain resource based on the received wake-up signal.

It should be understood that the foregoing is an example of the first time domain resource and the first frequency domain resource, and does not constitute a limitation on the first time domain resource and the first frequency domain resource. For example, T may be 40, and F may be 18.

603: The first terminal device sends the SL data to the second terminal device by using the second frequency domain resource.

After sending the wake-up signal to the second terminal device by using the first frequency domain resource, the first terminal device may send the SL data to the second terminal device by using the second frequency domain resource. The first terminal device may send the SL data to the second terminal device by using the second frequency domain resource after $N_{proc}$ time units after sending the wake-up signal. The first terminal device does not send the SL data to the second terminal device until the $N_{proc}$ time units after sending the wake-up signal. This can avoid a problem that the SL data fails to be received because the second terminal device does not activate the second frequency domain resource. Time is required between sending of the wake-up signal by the first terminal device and activation of the second frequency domain resource by the second terminal device, to ensure that the second terminal device receives the wake-up signal, and activates the second frequency domain resource based on the wake-up signal. This can ensure that the second terminal device correctly receives the SL data sent by the first terminal device by using the second frequency domain resource. $N_{proc}$ is an integer greater than or equal to 1. The time units may be slots, may be symbols, or may be mini-slots. For example, one time unit may be one symbol, or may be a plurality of symbols.

A value of $N_{proc}$ may be related to a subcarrier spacing. For example, when the subcarrier spacing increases, the value of $N_{proc}$ also increases. It can be learned that the value of $N_{proc}$ may be positively correlated with the subcarrier spacing.

The value of $N_{proc}$ may also be determined based on capability information of the second terminal device. The second terminal device may determine the value of $N_{proc}$ based on the capability information of the second terminal device, and then may indicate the value of $N_{proc}$ to the first terminal device by using signaling. Alternatively, the second terminal device may send the capability information of the second terminal device to the first terminal device. After receiving the capability information from the second terminal device, the first terminal device may determine the value of $N_{proc}$ based on the capability information of the second terminal device.

Correspondingly, the second terminal device may receive the SL data from the first terminal device by using the second frequency domain resource.

When the second terminal device receives all the SL data from the second terminal device, does not receive a wake-up signal from another terminal device, and does not transmit the SL data to the another terminal device, the second terminal device may switch the status of the second frequency domain resource from the activated state to the deactivated state.

When the second frequency domain resource of the second terminal device is in the deactivated state, the second terminal device needs to send or receive a sidelink synchronization signal block (S-SSB) on the second frequency domain resource. The S-SSB is used by the second terminal device to keep synchronization with another terminal device in a network. It can be learned that, even if the second frequency domain resource of the second terminal device is in the deactivated state, the first terminal device and the second terminal device may still keep synchronization, so that the first terminal device and the second terminal device have a same understanding of a start point and an end point of sending the wake-up signal. This can avoid a case in which the second terminal device cannot be woken up by the first terminal device due to a synchronization deviation, and can also avoid a problem that the another terminal device in the network is incorrectly woken up by the first terminal device due to the synchronization deviation.

The first frequency domain resource and the second frequency domain resource may correspond to different radio frequency sending modules and/or radio frequency receiving modules. When the first terminal device has only a function of a sending device, the first frequency domain resource and the second frequency domain resource in the first terminal device may correspond to the different radio frequency sending modules. When the first terminal device has both a function of a sending device and a function of a receiving device, the first frequency domain resource and the second frequency domain resource in the first terminal device may correspond to the different radio frequency sending modules and radio frequency receiving modules. When the second terminal device has only a function of a receiving device, the first frequency domain resource and the second frequency domain resource in the second terminal device may correspond to the different radio frequency receiving modules. When the second terminal device has both a function of a sending device and a function of a receiving device, the first frequency domain resource and the second frequency domain resource in the second terminal device may correspond to the different radio frequency sending modules and radio frequency receiving modules.

When one terminal device has only one radio frequency sending module and/or radio frequency receiving module, the terminal device can enable only one frequency domain resource to be in the activated state at a same time. Therefore, when the first terminal device needs to transmit the wake-up signal to the second terminal device by using the first frequency domain resource, the first terminal device needs to have a radio frequency sending module corresponding to the first frequency domain resource. When the second terminal device needs to receive the wake-up signal from the first terminal device by using the first frequency domain resource, the second terminal device needs to have a radio frequency receiving module corresponding to the first frequency domain resource. It can be learned that the first frequency domain resource and the second frequency domain resource each have the corresponding radio frequency sending module and/or radio frequency receiving module. In this way, both the first frequency domain resource and the second frequency domain resource may be in the activated state at a same time, so that the first frequency domain resource is used to transmit the wake-up signal, and the second frequency domain resource is used to transmit the SL data.

The first frequency domain resource may be continuously in the activated state. It should be understood that the second terminal device needs to continuously monitor the wake-up signal, and determine, based on the wake-up signal, whether the status of the second frequency domain resource needs to be switched from the deactivated state to the activated state. This can avoid missing the SL data. Therefore, on a second terminal device side, when the second terminal device is in an operating state, for example, after the second terminal device is powered on, the second terminal device needs to ensure that the first frequency domain resource is continuously in the activated state. In addition, on a first terminal device side, the first frequency domain resource may also be continuously in the activated state, and the status of the first frequency domain resource is not controlled based on an additional mechanism. This is conducive to hardware implementation of the first terminal device.

Figure 9:
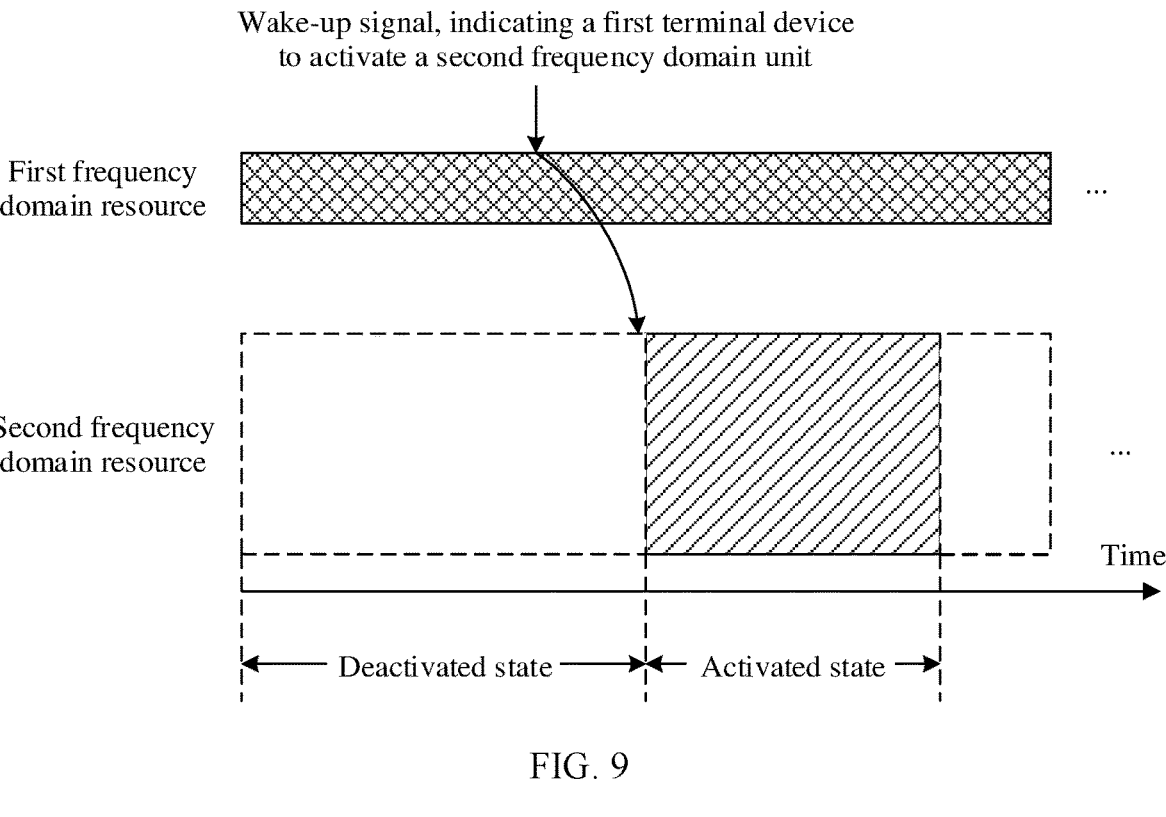
FIG. 9 is a schematic diagram of activating a second frequency domain resource after a second terminal device receives a wake-up signal according to an embodiment of the present invention.

FIG. 9 is a schematic diagram of activating a second frequency domain resource after a second terminal device receives a wake-up signal according to an embodiment of the present invention. As shown in FIG. 9, a first frequency domain resource of the second terminal device is continuously in an activated state, and a second frequency domain resource of the second terminal device is originally in a deactivated state. When a wake-up signal received by the second terminal device on the first frequency domain resource indicates the second terminal device to activate the second frequency domain resource, the second terminal device switches a status of the second frequency domain resource from the deactivated state to the activated state. After transmission of SL data ends, the second terminal device may switch the status of the second frequency domain resource from the activated state to the deactivated state.

On a first terminal device side, the first frequency domain resource may be in the activated state only when the wake-up signal needs to be transmitted. It should be understood that an operating manner of the first terminal device may be keeping the second frequency domain resource continuously in the activated state. Therefore, the first terminal device does not need to receive a wake-up signal from any other terminal device, that is, does not need to monitor the wake-up signal on the first frequency domain resource. This can avoid unnecessary power consumption.

Figure 10:
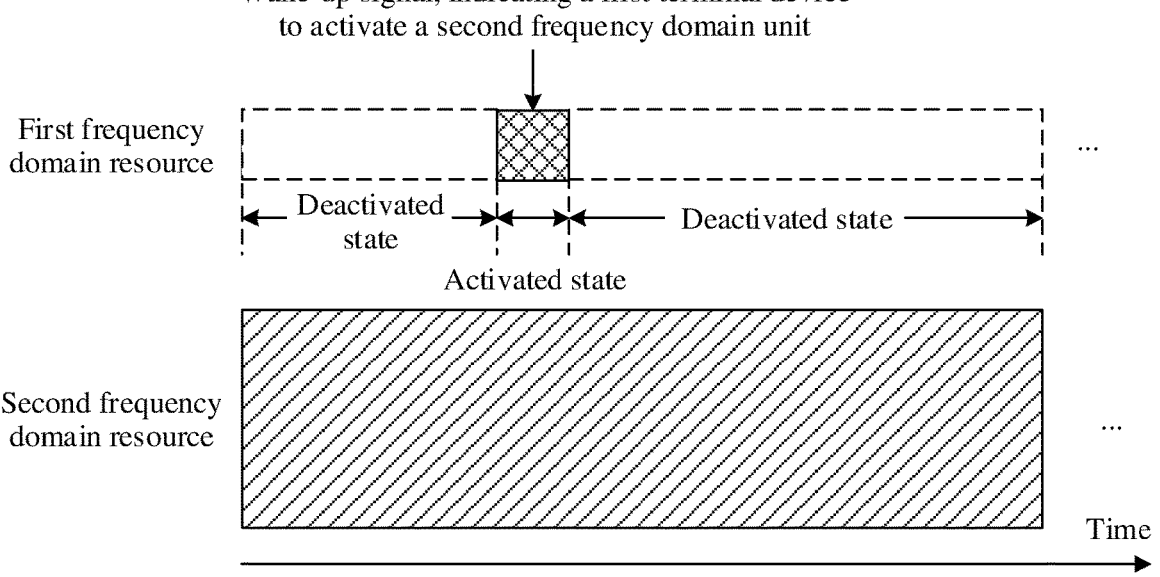
FIG. 10 is a schematic diagram of activating a first frequency domain resource when a first terminal device sends a wake-up signal according to an embodiment of the present invention.

FIG. 10 is a schematic diagram of activating a first frequency domain resource when a first terminal device sends a wake-up signal according to an embodiment of the present invention. As shown in FIG. 10, a second frequency domain resource of the first terminal device is continuously in an activated state, and a first frequency domain resource of the first terminal device is originally in a deactivated state. When the first terminal device needs to send a wake-up signal to a second terminal device by using the first frequency domain resource, the first terminal device switches a status of the first frequency domain resource from the deactivated state to the activated state. After transmission of the wake-up signal ends, the first terminal device may switch the status of the first frequency domain resource from the activated state to the deactivated state.

SL data may be carried on a PSSCH for transmission.

It should be understood that A may be 16, or may be another value. This is not limited herein.

It should be understood that the first frequency domain resource and the second frequency domain resource may be bandwidth, or may be bandwidth parts (bandwidth parts, BWPs).

It should be understood that, in the foregoing communication method, a function performed by the first terminal device may also be performed by a module (for example, a chip) in the first terminal device, and a function performed by the second terminal device may also be performed by a module (for example, a chip) in the second terminal device.

It should be understood that, for related information (namely, same information or similar information) in the foregoing embodiments, refer to each other.

Based on the foregoing network architecture, FIG. 11 is a schematic diagram of a structure of a communication apparatus according to an embodiment of the present invention. The communication apparatus may be a first terminal device, or may be a module in a first terminal device. As shown in FIG. 11, the communication apparatus may include:

a sending unit 1101, configured to send a wake-up signal to a second terminal device by using a first frequency domain resource. The wake-up signal is used to activate a second frequency domain resource. The first frequency domain resource is used by two or more terminal devices to transmit wake-up signals. The first frequency domain resource does not overlap the second frequency domain resource.

The sending unit 1101 is further configured to send SL data to the second terminal device by using the second frequency domain resource.

In an embodiment, a modulation scheme for the wake-up signal is OOK or BPSK.

In an embodiment, the wake-up signal includes a first sequence. The first sequence is determined based on a physical layer destination identifier of the second terminal device. The first sequence occupies a plurality of time units.

In an embodiment, the first sequence includes the physical layer destination identifier of the second terminal device.

In an embodiment, the wake-up signal further includes a second sequence. The second sequence includes a sequence obtained after the physical layer destination identifier of the second terminal device is negated. Time units occupied by the first sequence and the second sequence are the same.

In an embodiment, the communication apparatus may further include:

a processing unit 1102, configured to determine a third frequency domain resource from the first frequency domain resource based on a physical layer destination identifier of the second terminal device.

That the sending unit 1101 sends a wake-up signal to a second terminal device by using a first frequency domain resource includes:

sending the wake-up signal to the second terminal device by using the third frequency domain resource.

In an embodiment, the processing unit 1102 is further configured to determine a second time domain resource from a first time domain resource based on the physical layer destination identifier of the second terminal device. The first time domain resource is a time domain resource corresponding to the first frequency domain resource. The second time domain resource is a time domain resource corresponding to the third frequency domain resource.

That the sending unit 1101 sends the wake-up signal to the second terminal device by using the third frequency domain resource includes:

sending the wake-up signal to the second terminal device by using the second time domain resource and the third frequency domain resource.

In an embodiment, that the processing unit 1102 determines a second time domain resource from a first time domain resource based on the physical layer destination identifier of the second terminal device includes:

determining the second time domain resource from the first time domain resource based on P MSBs in the physical layer destination identifier of the second terminal device.

That the processing unit 1102 determines a third frequency domain resource from the first frequency domain resource based on a physical layer destination identifier of the second terminal device includes:

determining the third frequency domain resource from the first frequency domain resource based on Q LSBs in the physical layer destination identifier of the second terminal device. P and Q are integers less than or equal to A. A is a quantity of bits included in the physical layer destination identifier of the second terminal device.

In an embodiment, the first frequency domain resource and the second frequency domain resource correspond to different radio frequency sending modules and/or radio frequency receiving modules.

In an embodiment, the physical layer destination identifier of the second terminal device is a 16-bit bit sequence.

For more detailed descriptions of the sending unit 1101 and the processing unit 1102, directly refer to related descriptions of the first terminal device in the method embodiment shown in FIG. 6. Details are not described herein.

Based on the foregoing network architecture, FIG. 12 is a schematic diagram of a structure of another communication apparatus according to an embodiment of the present invention. The communication apparatus may be a second terminal device, or may be a module in a second terminal device. As shown in FIG. 12, the communication apparatus may include:

a receiving unit 1201, configured to receive a wake-up signal from a first terminal device by using a first frequency domain resource, where the first frequency domain resource is used by two or more terminal devices to transmit wake-up signals; and a processing unit 1202, configured to activate a second frequency domain resource based on the wake-up signal, where the first frequency domain resource does not overlap the second frequency domain resource.

The receiving unit 1201 is further configured to receive SL data from the first terminal device by using the second frequency domain resource.

In an embodiment, a modulation scheme for the wake-up signal is OOK or BPSK.

In an embodiment, the wake-up signal includes a first sequence. The first sequence is determined based on a physical layer destination identifier of the second terminal device. The first sequence occupies a plurality of time units.

That the receiving unit 1201 receives a wake-up signal from a first terminal device by using a first frequency domain resource includes:

receiving the wake-up signal from the first terminal device by using the first frequency domain resource based on the physical layer destination identifier of the second terminal device.

In an embodiment, the first sequence includes the physical layer destination identifier of the second terminal device.

That the receiving unit 1201 receives the wake-up signal from the first terminal device by using the first frequency domain resource based on the physical layer destination identifier of the second terminal device includes:

receiving, by using the first frequency domain resource, the wake-up signal that is from the first terminal device and that includes the physical layer destination identifier of the second terminal device.

In an embodiment, the wake-up signal further includes a second sequence. The second sequence includes a sequence obtained after the physical layer destination identifier of the second terminal device is negated. Time units occupied by the first sequence and the second sequence are the same.

That the receiving unit 1201 receives the wake-up signal from the first terminal device by using the first frequency domain resource based on the physical layer destination identifier of the second terminal device includes:

receiving, by using the first frequency domain resource, the wake-up signal that is from the first terminal device and that includes the physical layer destination identifier of the second terminal device and the sequence obtained after the physical layer destination identifier of the second terminal device is negated.

In an embodiment, the processing unit 1202 is further configured to determine a third frequency domain resource from the first frequency domain resource based on a physical layer destination identifier of the second terminal device.

That the receiving unit 1201 receives a wake-up signal from a first terminal device by using a first frequency domain resource includes:

receiving the wake-up signal from the first terminal device by using the third frequency domain resource.

In an embodiment, the processing unit 1202 is further configured to determine a second time domain resource from a first time domain resource based on the physical layer destination identifier of the second terminal device. The first time domain resource is a time domain resource corresponding to the first frequency domain resource. The second time domain resource is a time domain resource corresponding to the third frequency domain resource.

That the receiving unit 1201 receives the wake-up signal from the first terminal device by using the third frequency domain resource includes:

receiving the wake-up signal from the first terminal device by using the second time domain resource and the third frequency domain resource.

In an embodiment, that the processing unit 1202 determines a second time domain resource from a first time domain resource based on the physical layer destination identifier of the second terminal device includes:

determining the second time domain resource from the first time domain resource based on P MSBs in the physical layer destination identifier of the second terminal device.

That the processing unit 1202 determines a third frequency domain resource from the first frequency domain resource based on a physical layer destination identifier of the second terminal device includes:

determining the third frequency domain resource from the first frequency domain resource based on Q LSBs in the physical layer destination identifier of the second terminal device. P and Q are integers less than or equal to A. A is a quantity of bits included in the physical layer destination identifier of the second terminal device.

In an embodiment, the first frequency domain resource and the second frequency domain resource correspond to different radio frequency sending modules and/or radio frequency receiving modules.

In an embodiment, the physical layer destination identifier of the second terminal device is a 16-bit bit sequence.

For more detailed descriptions of the receiving unit 1201 and the processing unit 1202, directly refer to related descriptions of the second terminal device in the method embodiment shown in FIG. 6. Details are not described herein.

Based on the foregoing network architecture, FIG. 13 is a schematic diagram of a structure of still another communication apparatus according to an embodiment of the present invention. The communication apparatus may be the communication apparatus in the foregoing embodiments, and is configured to implement the foregoing method embodiments. The communication apparatus may be the communication apparatus that has a function of the terminal device in the foregoing embodiments, or may be a functional module in the foregoing communication apparatus. For specific functions of the communication apparatus, refer to the description in the foregoing method embodiments.

The communication apparatus may include one or more processors 1301. The processor 1301 may also be referred to as a processing unit, and may implement a specific control function. The processor 1301 may be a general-purpose processor, a dedicated processor, or the like. For example, the processor 1301 includes a baseband processor, a central processing unit, an application processor, a modem processor, a graphics processing unit, an image signal processor, a digital signal processor, a video codec processor, a controller, a memory, a neural-network processing unit, and/or the like. The baseband processor may be configured to process a communication protocol and communication data. The central processing unit may be configured to control the communication apparatus, execute a software program, and/or process data. Different processors may be independent components, or may be integrated into one or more processors, for example, integrated into one or more application-specific integrated circuits.

Optionally, the communication apparatus may include one or more memories 1302, configured to store instructions 1304. The instructions may be run on the processor 1301, so that the communication apparatus performs the method described in the foregoing method embodiments.

Optionally, the memory 1302 may further store data. The processor 1301 and the memory 1302 may be separately disposed, or may be integrated together.

Optionally, the communication apparatus may include instructions 1303 (which may also be referred to as code or a program sometimes). The instructions 1303 may be run on the processor 1301, so that the communication apparatus performs the method described in the foregoing embodiments. The processor 1301 may store data.

Optionally, the communication apparatus may further include a transceiver 1305 and an antenna 1306. The transceiver 1305 may be referred to as a transceiver unit, a transceiver machine, a transceiver circuit, a transceiver, an input/output interface, or the like, and is configured to implement a receiving/sending function of the communication apparatus by using the antenna 1306.

Optionally, the communication apparatus may further include one or more of the following components: a wireless communication module, an audio module, an external memory interface, an internal memory, a universal serial bus (USB) interface, a power management module, an antenna, a speaker, a microphone, an input/output module, a sensor module, a motor, a camera, a display, or the like. It can be understood that, in some embodiments, the communication apparatus may include more or fewer components, or some components are integrated, or some components are split. These components may be implemented by hardware, software, or a combination of software and hardware.

The processor 1301 and the transceiver 1305 described in the present invention may be implemented on an integrated circuit (IC), an analog IC, a radio frequency integrated circuit (RFID), a mixed-signal IC, an application-specific integrated circuit (ASIC), a printed circuit board (PCB), an electronic device, or the like. The communication apparatus described in this specification may be an independent device (for example, an independent integrated circuit or a mobile phone), or may be a part of a large device (for example, a module that can be embedded in another device). For details, refer to the foregoing descriptions of the terminal device. Details are not described herein again.

Figure 14:
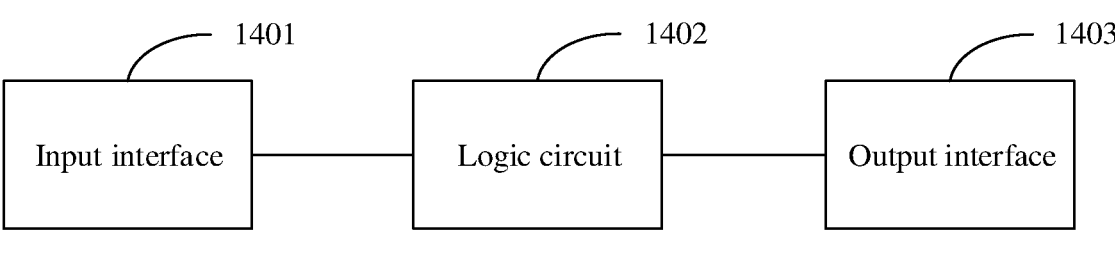
FIG. 14 is a schematic diagram of a structure of still another communication apparatus according to an embodiment of the present invention.

Based on the foregoing network architecture, FIG. 14 is a schematic diagram of a structure of still another communication apparatus according to an embodiment of the present invention. As shown in FIG. 14, the communication apparatus may include an input interface 1401, a logic circuit 1402, and an output interface 1403. The input interface 1401 is connected to the output interface 1403 through the logic circuit 1402. The input interface 1401 is configured to receive information from another communication apparatus. The output interface 1403 is configured to output, schedule, or send information to another communication apparatus. The logic circuit 1402 is configured to perform an operation other than operations of the input interface 1401 and the output interface 1403, for example, implement the functions implemented by the processor 1301 in the foregoing embodiment. The communication apparatus may be a first terminal device, or may be a second terminal device. For more detailed descriptions of the input interface 1401, the logic circuit 1402, and the output interface 1403, directly refer to related descriptions of the first terminal device and the second terminal device in the foregoing method embodiments. Details are not described herein again.

An embodiment of the present invention further discloses a computer-readable storage medium. The computer-readable storage medium stores instructions. When the instructions are executed, the methods in the foregoing method embodiments are performed.

An embodiment of the present invention further discloses a computer program product including instructions. When the instructions are executed, the methods in the foregoing method embodiments are performed.

An embodiment of the present invention further discloses a communication system. The communication system may include a first terminal device and a second terminal device. For specific descriptions, refer to the communication method shown in FIG. 6.

In the foregoing specific implementations, the objectives, technical solutions, and beneficial effects of this application are further described in detail. It should be understood that the foregoing descriptions are only specific implementations of this application, but are not intended to limit the protection scope of this application. Any modification, equivalent replacement, improvement, or the like made based on the technical solutions of this application shall fall within the protection scope of this application.

The invention claimed is:

1. A communication method, comprising:
sending a wake-up signal to a second terminal device by using a first frequency domain resource, wherein the wake-up signal is configured to activate a second frequency domain resource, the first frequency domain resource is used by two or more terminal devices to transmit wake-up signals, and the first frequency domain resource does not overlap the second frequency domain resource; and
sending sidelink (SL) data to the second terminal device by using the second frequency domain resource.

2. The method according to claim 1, wherein the wake-up signal comprises a first sequence, the first sequence is determined based on a physical layer destination identifier of the second terminal device, and the first sequence occupies a plurality of time units.

3. The method according to claim 2, wherein the wake-up signal further comprises a second sequence, the second sequence comprises a sequence obtained by logically negating the physical layer destination identifier of the second terminal device, and time units occupied by the first sequence and the second sequence are the same.

4. The method according to claim 1, wherein the method further comprises:
determining a third frequency domain resource within the first frequency domain resource based on a physical layer destination identifier of the second terminal device; and
the sending the wake-up signal to the second terminal device by using the first frequency domain resource comprises:
sending the wake-up signal to the second terminal device by using the third frequency domain resource.

5. The method according to claim 4, wherein the method further comprises:

determining a second time domain resource within a first time domain resource based on the physical layer destination identifier of the second terminal device, wherein the first time domain resource is a time domain resource corresponding to the first frequency domain resource, and the second time domain resource is a time domain resource corresponding to the third frequency domain resource; and
the sending the wake-up signal to the second terminal device by using the third frequency domain resource comprises:
sending the wake-up signal to the second terminal device by using the second time domain resource and the third frequency domain resource.

6. The method according to claim 5, wherein the determining the second time domain resource within the first time domain resource based on the physical layer destination identifier of the second terminal device comprises:
determining the second time domain resource within the first time domain resource based on P most significant bits (MSBs) in the physical layer destination identifier of the second terminal device; and
the determining a third frequency domain resource within the first frequency domain resource based on the physical layer destination identifier of the second terminal device comprises:
determining the third frequency domain resource within the first frequency domain resource based on Q least significant bits (LSBs) in the physical layer destination identifier of the second terminal device, wherein P and Q are integers less than or equal to A, and A is a quantity of bits comprised in the physical layer destination identifier.

7. A communication method performed by a second terminal device, the method comprising:
receiving a wake-up signal from a first terminal device by using a first frequency domain resource, wherein the first frequency domain resource is used by two or more terminal devices to transmit wake-up signals;
activating a second frequency domain resource based on the wake-up signal, wherein the first frequency domain resource does not overlap the second frequency domain resource; and
receiving sidelink (SL) data from the first terminal device by using the second frequency domain resource.

8. The method according to claim 7, wherein the wake-up signal comprises a first sequence, the first sequence is based on a physical layer destination identifier of the second terminal device, and the first sequence occupies a plurality of time units; and
the receiving the wake-up signal from the first terminal device by using the first frequency domain resource comprises:
receiving the wake-up signal from the first terminal device by using the first frequency domain resource based on the physical layer destination identifier of the second terminal device.

9. The method according to claim 8, wherein the wake-up signal further comprises a second sequence, the second sequence comprises a sequence obtained by logically negating the physical layer destination identifier of the second terminal device, and time units occupied by the first sequence and the second sequence are the same; and
the receiving the wake-up signal from the first terminal device by using the first frequency domain resource based on the physical layer destination identifier of the second terminal device comprises:

receiving by using the first frequency domain resource, the wake-up signal that is from the first terminal device and that comprises the physical layer destination identifier of the second terminal device and the sequence obtained by logically negating the physical layer destination identifier of the second terminal device.

10. The method according to claim 7, wherein the method further comprises:

determining a third frequency domain resource within the first frequency domain resource based on a physical layer destination identifier of the second terminal device; and the receiving the wake-up signal from the first terminal device by using the first frequency domain resource comprises:

receiving the wake-up signal from the first terminal device by using the third frequency domain resource.

11. The method according to claim 10, wherein the method further comprises:

determining a second time domain resource within a first time domain resource based on the physical layer destination identifier of the second terminal device, wherein the first time domain resource is a time domain resource corresponding to the first frequency domain resource, and the second time domain resource is a time domain resource corresponding to the third frequency domain resource; and the receiving the wake-up signal from the first terminal device by using the third frequency domain resource comprises:

receiving, by the second terminal device, the wake-up signal from the first terminal device by using the second time domain resource and the third frequency domain resource.

12. The method according to claim 11, wherein the determining the second time domain resource within the first time domain resource based on the physical layer destination identifier of the second terminal device comprises:

determining the second time domain resource within the first time domain resource based on P most significant bits (MSBs) in the physical layer destination identifier of the second terminal device; and the determining the third frequency domain resource within the first frequency domain resource based on the physical layer destination identifier of the second terminal device comprises:

determining the third frequency domain resource from the first frequency domain resource based on Q least significant bits (LSBs) in the physical layer destination identifier of the second terminal device, wherein P and Q are integers less than or equal to A, and A is a quantity of bits comprised in the physical layer destination identifier.

13. An apparatus, comprising: one or more memories and one or more processors, the memories storing instructions, and the processors operatively connected to the memories such that the processors can execute the instructions to perform a method comprising:

sending a wake-up signal to a second terminal device by using a first frequency domain resource, wherein the wake-up signal is configured to activate a second frequency domain resource, wherein the first frequency domain resource can be used by two or more terminal devices to transmit wake-up signals, and the first frequency domain resource does not overlap the second frequency domain resource; and sending sidelink (SL) data to the second terminal device by using the second frequency domain resource.

14. The apparatus according to claim 13, wherein the wake-up signal comprises a first sequence, the first sequence is determined based on a physical layer destination identifier of the second terminal device, and the first sequence occupies a plurality of time units.

15. The apparatus according to claim 14, wherein the wake-up signal further comprises a second sequence, the second sequence comprises a sequence obtained by logically negating the physical layer destination identifier of the second terminal device, and time units occupied by the first sequence and the second sequence are the same.

16. The apparatus according to claim 13, wherein the method further comprises:

determining a third frequency domain resource within the first frequency domain resource based on a physical layer destination identifier of the second terminal device; and the sending the wake-up signal to the second terminal device by using the first frequency domain resource comprises:

sending the wake-up signal to the second terminal device by using the third frequency domain resource.

17. The apparatus according to claim 16, wherein the method further comprises:

determining a second time domain resource within a first time domain resource based on the physical layer destination identifier of the second terminal device, wherein the first time domain resource is a time domain resource corresponding to the first frequency domain resource, and the second time domain resource is a time domain resource corresponding to the third frequency domain resource; and the sending the wake-up signal to the second terminal device by using the third frequency domain resource comprises:

sending the wake-up signal to the second terminal device by using the second time domain resource and the third frequency domain resource.

18. A second terminal device, comprising: one or more memories and one or more processors, the memories storing instructions, and the processors operatively connected to the memories such that the processors can execute the instructions to perform a method comprising:

receiving a wake-up signal from a first terminal device by using a first frequency domain resource, wherein the first frequency domain resource can be used by two or more terminal devices to transmit wake-up signals;

activating a second frequency domain resource based on the wake-up signal, wherein the first frequency domain resource does not overlap the second frequency domain resource; and receiving sidelink SL data from the first terminal device by using the second frequency domain resource.

19. The second terminal device according to claim 18, wherein the wake-up signal comprises a first sequence, the first sequence is based on a physical layer destination identifier of the second terminal device, and the first sequence occupies a plurality of time units; and the receiving the wake-up signal from the first terminal device by using the first frequency domain resource comprises:

receiving the wake-up signal from the first terminal device by using the first frequency domain resource based on the physical layer destination identifier of the second terminal device.

20. The second terminal device according to claim 19, wherein the wake-up signal further comprises a second sequence, the second sequence comprises a sequence obtained by logically negating the physical layer destination identifier of the second terminal device, and time units 5 occupied by the first sequence and the second sequence are the same; and the receive the wake-up signal from the first terminal device by using the first frequency domain resource based on the physical layer destination identifier of the 10 second terminal device comprises:

receiving by using the first frequency domain resource, the wake-up signal that is from the first terminal device and that comprises the physical layer destination identifier of the second terminal device and the sequence 15 obtained by logically negating the physical layer destination identifier of the second terminal device.

\* \* \* \* \*